US010630367B2

(12) United States Patent
Motozuka et al.

(10) Patent No.: US 10,630,367 B2
(45) Date of Patent: Apr. 21, 2020

(54) TRANSMISSION APPARATUS, TRANSMISSION METHOD, RECEPTION APPARATUS, AND RECEPTION METHOD

(71) Applicant: Panasonic Intellectual Property Corporation of America, Torrance, CA (US)

(72) Inventors: Hiroyuki Motozuka, Kanagawa (JP); Takenori Sakamoto, Kanagawa (JP); Naganori Shirakata, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/375,907

(22) Filed: Apr. 5, 2019

(65) Prior Publication Data

US 2019/0238200 A1 Aug. 1, 2019

Related U.S. Application Data

(63) Continuation of application No. PCT/JP2017/038434, filed on Oct. 25, 2017.
(Continued)

(30) Foreign Application Priority Data

Oct. 13, 2017 (JP) ................................ 2017-199541

(51) Int. Cl.
*H04B 7/06* (2006.01)
*H04L 27/26* (2006.01)
(Continued)

(52) U.S. Cl.
CPC ............... *H04B 7/068* (2013.01); *H04B 7/06* (2013.01); *H04B 7/0617* (2013.01);
(Continued)

(58) Field of Classification Search
CPC ..................................................... H04B 7/068
(Continued)

(56) References Cited

U.S. PATENT DOCUMENTS

2009/0298544 A1* 12/2009 Karampuri ............ H04W 88/10 455/561
2012/0320813 A1* 12/2012 Han ...................... H04L 1/1861 370/311
2015/0304013 A1 10/2015 Ouchi et al.

OTHER PUBLICATIONS

International Search Report of PCT application No. PCT/JP2017/038434 dated Dec. 26, 2017.
(Continued)

*Primary Examiner* — Lihong Yu
(74) *Attorney, Agent, or Firm* — Seed IP Law Group LLP

(57) ABSTRACT

A transmission apparatus includes a signal processing circuit and a transmission circuit. The signal processing circuit generates a first precoded signal and a second precoded signal by performing a precoding process on a first baseband signal and a second baseband signal, and generates a second reversed signal by performing an order reversion process on a symbol sequence forming the second precoded signal thereby generating a first transmission signal and a second transmission signal from the first baseband signal and the second baseband signal. The transmission circuit transmits the first transmission signal and the second transmission signal respectively from different antennas.

7 Claims, 16 Drawing Sheets

Related U.S. Application Data

(60) Provisional application No. 62/417,536, filed on Nov. 4, 2016.

(51) Int. Cl.
*H04B 7/08* (2006.01)
*H04L 1/00* (2006.01)
*H04B 7/12* (2006.01)
*H04L 1/06* (2006.01)
*H04B 7/0413* (2017.01)

(52) U.S. Cl.
CPC ......... *H04B 7/0634* (2013.01); *H04B 7/0667* (2013.01); *H04B 7/0682* (2013.01); *H04B 7/0842* (2013.01); *H04B 7/0891* (2013.01); *H04B 7/12* (2013.01); *H04L 1/0078* (2013.01); *H04L 1/06* (2013.01); *H04L 27/2605* (2013.01); *H04L 27/2636* (2013.01); *H04L 27/2637* (2013.01); *H04B 7/0413* (2013.01)

(58) Field of Classification Search
USPC .......................................................... 375/267
See application file for complete search history.

(56) References Cited

OTHER PUBLICATIONS

David Vargas et al., "MIMO for DVB-NGH, The Next Generation Mobile TV Broadcasting", IEEE Communications Magazine, vol. 57, No. 7, Jul. 15, 2013, pp. 130-137.

IEEE 802.11-16/0632r1, "Performance Analysis of Robust Transmission Modes for MIMO in 11ay", May 15, 2016.

IEEE 802.11-16/0631r1, "Performance Comparison of Dual Carrier and Regular Modulations for SU-MIMO in 11ay", May 15, 2016.

IEEE Std 802.11ad (TM)—2012, IEEE Standard for Information technology—Telecommunications and information exchange between systems, Local and metropolitan area networks—Specific requirements, Part 11: Wireless LAN Medium Access Control (MAC) and Physical Layer (PHY) Specifications, Amendment 3: Enhancements for Very High Throughput in the 60 GHz Band, Dec. 28, 2012.

The Extended European Search Report dated Sep. 27, 2019 for the related European Patent Application No. 17867427.1.

* cited by examiner

TRANSMISSION APPARATUS, TRANSMISSION METHOD, RECEPTION APPARATUS, AND RECEPTION METHOD

BACKGROUND

1. Technical Field

The present disclosure relates to a transmission apparatus that performs communication using a multiantenna, a transmission method, a reception apparatus, and a reception method.

2. Description of the Related Art

The IEEE802.11ad standard is one of wireless LAN-related standards and is a standard in terms of wireless communication using a 60 GHz band millimeter wave (IEEE802.11Ad™_-2012 Dec. 28, 2012). In the IEEE802.11ad standard, transmission using a single carrier is defined.

As one of communication technologies using a multiantenna, MIMO (Multiple-Input Multiple-Output) is known ("MIMO for DVB-NGH, the next generation mobile TV broadcasting," IEEE Commun. Mag., vol. 57, no. 7, pp. 130-137, July 2013.) Use of MIMO makes it possible to enhance a space diversity effect and improve reception quality. Also see, for example, IEEE802.11-16/0631r0 May 15, 2016, and IEEE802.11-16/0632r0 May 15, 2016.

SUMMARY

However, in MIMO communication using a single carrier, there is a possibility that a sufficient frequency diversity effect is not achieved.

One non-limiting and exemplary embodiment provides a transmission apparatus, a transmission method, a reception apparatus, and a reception method, that provide an enhanced frequency diversity effect in MIMO communication using a single carrier.

In one general aspect, the techniques disclosed here feature a transmission apparatus including a signal processing circuit that generates a first precoded signal and a second precoded signal by performing a precoding process on a first baseband signal and a second baseband signal, and generates a second reversed signal by performing an order reversion process on a symbol sequence forming the second precoded signal thereby generating a first transmission signal and a second transmission signal from the first baseband signal and the second baseband signal, and a transmission circuit that transmits the first transmission signal and the second transmission signal respectively from different antennas.

According to the aspect of the present disclosure, it is possible to enhance the frequency diversity effect in the MIMO communication using the single carrier.

It should be noted that general or specific embodiments may be implemented as a system, a method, an integrated circuit, a computer program, a storage medium, or any selective combination of a system, an apparatus, a method, an integrated circuit, a computer program, and a storage medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure are described in detail below with reference to drawings.

First Embodiment

Figure 1:
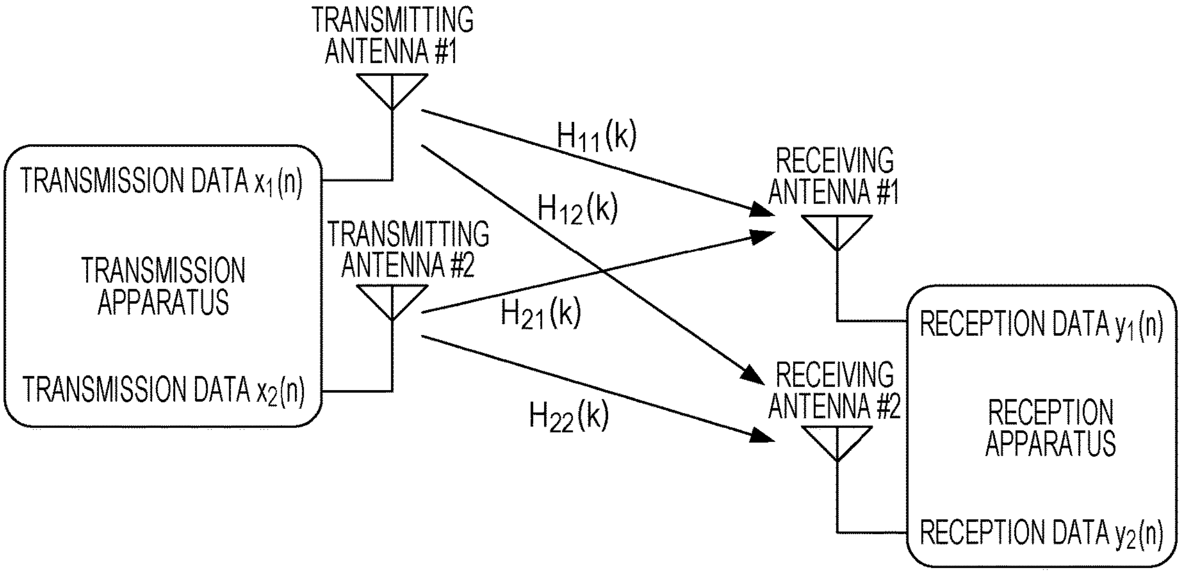
FIG. 1 is a diagram illustrating an example of a configuration of a MIMO communication system according to a first embodiment.

FIG. 1 is a diagram illustrating an example of a configuration of a MIMO communication system. A transmission apparatus includes a plurality of transmitting antennas. A reception apparatus includes a plurality of receiving antennas.

A radio transmission path between one transmitting antenna and one receiving antenna is referred to as a channel. In FIG. 1, a channel $H_{11}(k)$ exists between a first transmitting antenna and a first receiving antenna, a channel $H_{12}(k)$ exists between the first transmitting antenna and a second receiving antenna, a channel $H_{21}(k)$ exists between a second transmitting antenna and the first receiving antenna, and a channel $H_{22}(k)$ exists between the second transmitting antenna and the second receiving antenna. In each channel includes, for example, a mixture of a direct wave, a reflected wave, a diffracted wave, and/or a scattered wave occurs. Values of channels $H_{11}(k)$, $H_{12}(k)$, $H_{21}(k)$, and $H_{22}(k)$ indicate frequency responses of the respective channels. Each frequency response is represented by a complex number with an index k of frequency.

The transmission apparatus transmits different transmission data from the respective transmitting antennas simultaneously, that is, at the same sampling timing in a D/A converter. The reception apparatus includes a plurality of receiving antennas. The reception apparatus receives reception data at the respective receiving antennas simultaneously, that is, at the same sampling timing in an A/D converter. However, there is a difference in delay among the channels, and thus all pieces of transmission data transmitted simultaneously from the transmission apparatus are not necessarily received at the same time by the reception apparatus.

Figure 2:
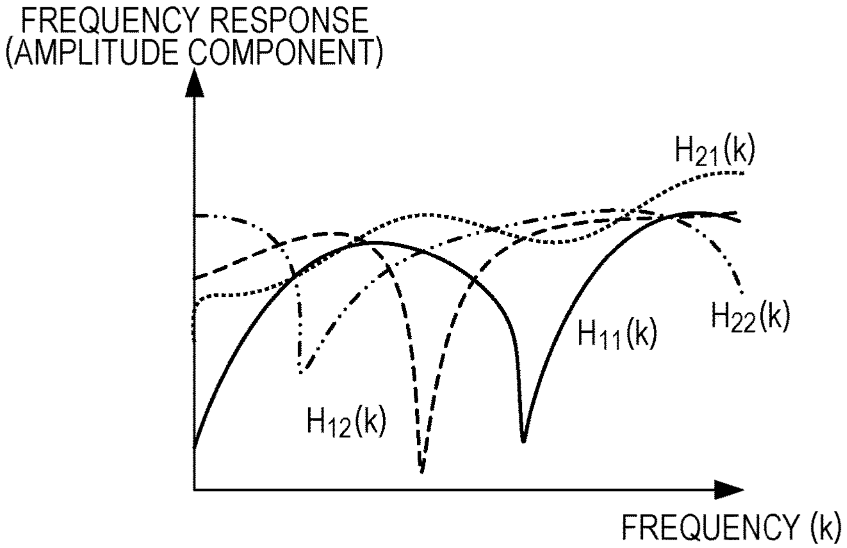
FIG. 2 is a diagram illustrating an example of an amplitude component distribution in a frequency response.

FIG. 2 is a diagram illustrating an example of an amplitude component distribution of a frequency response. In the example shown in FIG. 2, frequency responses are different among channels, and a correlation among channels is low.

In a case where the reception apparatus receives transmission data $x_1(b, n)$ from the first transmitting antenna, the reception apparatus performs, for example, a process described below. That is, the reception apparatus multiplies the reception data received via the first receiving antenna and the reception data received via the second receiving antenna by respective complex weighting coefficients, and adds results together such that reception signals via the channel $H_{11}(k)$ and the channel $H_{12}(k)$ are intensified while reception signals via the channel $H_{21}(k)$ and the channel $H_{22}(k)$ are suppressed. The weighting factors are calculated using, for example, an MMSE (Minimum Mean Square Error) method described later.

Figure 3:
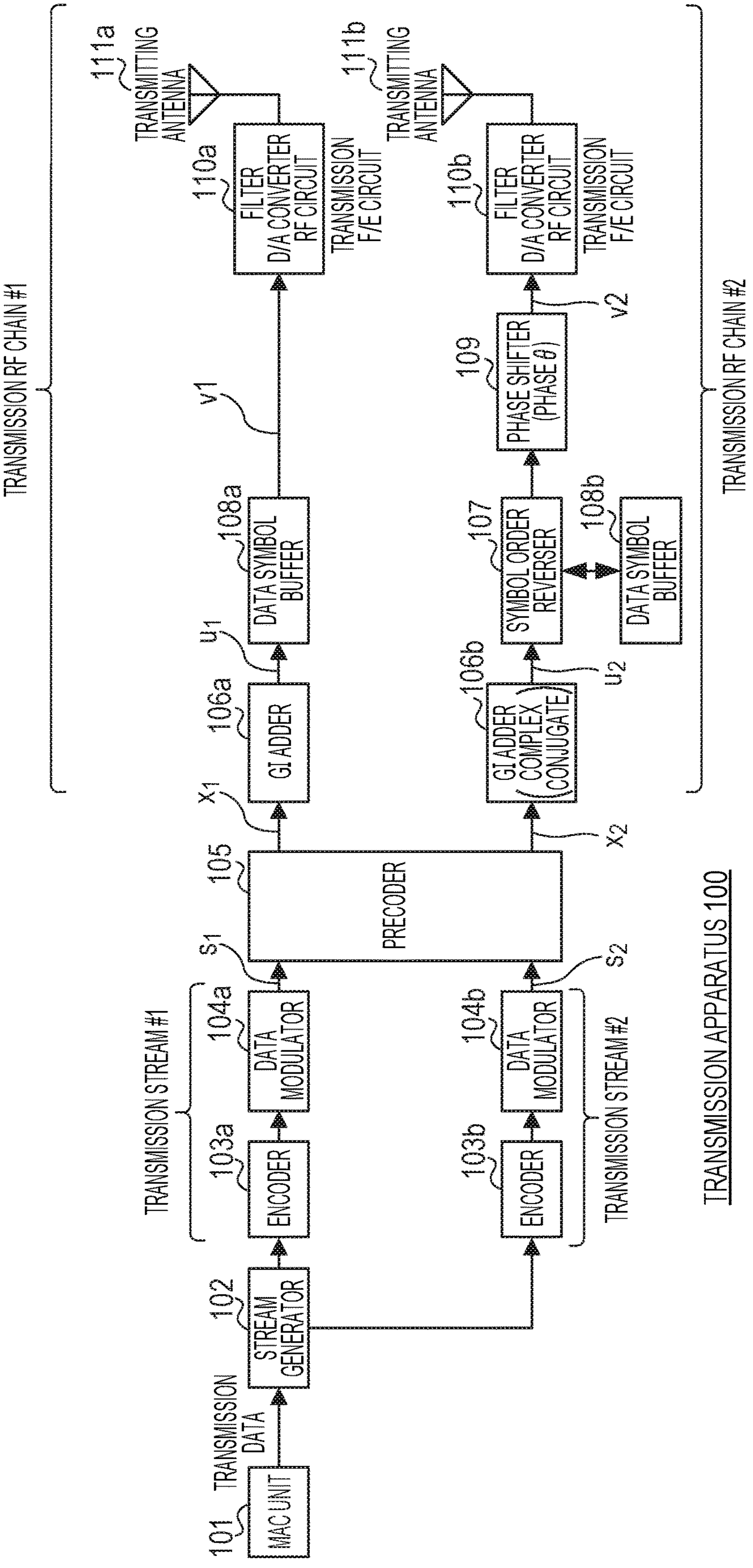
FIG. 3 is a diagram illustrating an example of a configuration of a transmission apparatus according to the first embodiment.

FIG. 3 is a diagram illustrating an example of a configuration of the transmission apparatus 100. In FIG. 3, the transmission apparatus 100 includes a MAC unit 101, a stream generator 102, encoders 103*a* and 103*b*, data modulators 104*a* and 104*b*, a precoder 105, GI (Guard Interval) adders 106*a* and 106*b*, a symbol order reverser 107, data symbol buffers 108*a* and 108*b*, a phase shifter 109, transmission F/E circuits (filter, D/A converter, and RF circuits) 110 an and 110*b*, and transmitting antennas 111*a* and 111*b*.

The transmission apparatus 100 performs π/2-BPSK modulation by the data modulators 104*a* and 104*b* and transmits different data from the respective transmitting antennas 111*a* and 111*b*.

The MAC unit 101 generates transmission data and outputs the generated transmission data to the stream generator 102.

The stream generator 102 divides the transmission data into two pieces, that is, first stream data and second stream data. For example, the stream generator 102 assigns odd-numbered bits of the transmission data to the first stream data while the stream generator 102 assigns even-numbered bits of the transmission data to the second stream data. The stream generator 102 outputs the first stream data to the encoder 103*a*, and outputs the second stream data to the encoder 103*b*. The stream generator 102 may calculate CRC (Cyclic Redundancy Check) for the transmission data and may add the resultant CRC at the end of the transmission data, and thereafter, the stream generator 102 may generate the stream data.

A process performed on the first stream data output from the stream generator 102 is referred to as a first transmission stream process. The first transmission stream process is performed by the encoder 103*a* and the data modulator 104*a*.

A process performed on the second stream data output from the stream generator 102 is referred to as a second transmission stream process. The second transmission stream process is performed by the encoder 103*b* and the data modulator 104*b*.

The encoders 103*a* and 103*b* perform an error correction coding process on each piece of stream data. The encoders 103*a* and 103*b* may employ, for example, LDPC (Low Density Parity Check) coding as the error correction coding scheme.

The data modulators 104*a* and 104*b* perform a modulation process on each piece of stream data obtained as a result of the error correction coding process performed by the encoders 103*a* and 103*b*. The data modulators 104*a* and 104*b* employ, for example, π/2-BPSK as the data modulation scheme.

Figure 4A:
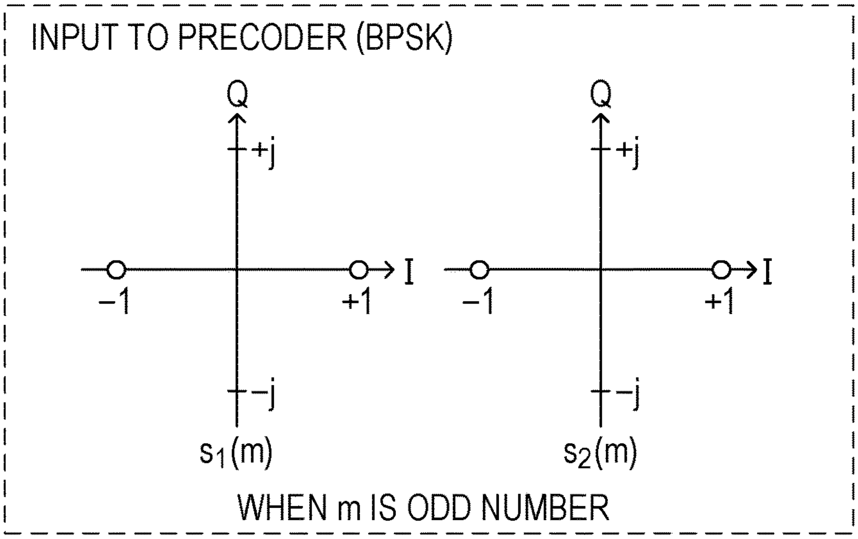
FIG. 4A is a diagram illustrating an example of a constellation for π/2-BPSK for a case where a symbol index is odd number.
Figure 4B:
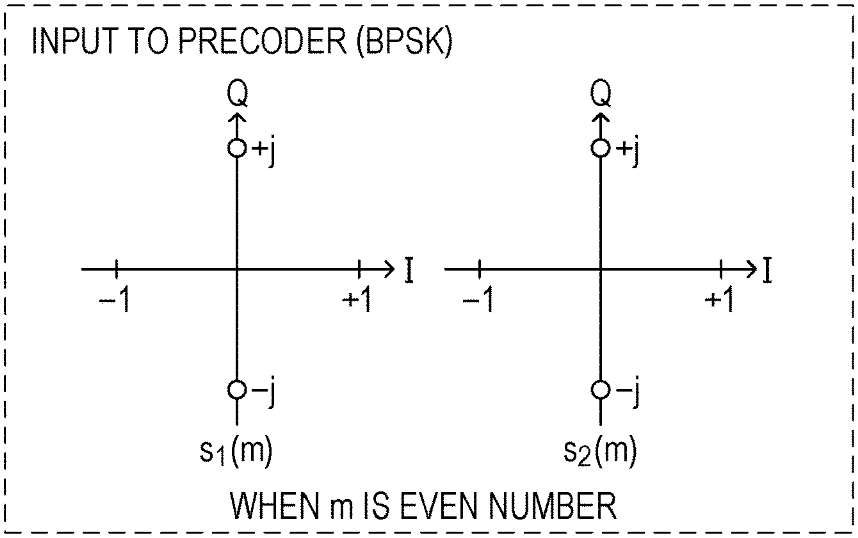
FIG. 4B is a diagram illustrating an example of a constellation for π/2-BPSK for a case where a symbol index is an even number.

FIG. 4A illustrates an example of a constellation for π/2-BPSK for a case where a symbol index m is an odd number. FIG. 4B illustrates an example of a constellation of π/2-BPSK for a case where a symbol index m is an even number. Data (also referred to as a "modulated signal") output by the data modulator 104*a* is referred to as a modulated symbol $s_1(m)$, and data output by the data modulator 104*b* is referred to as a modulated symbol $s_2(m)$ where m is a positive integer representing a symbol index.

In a case where the data modulator 104*a* performs π/2-BPSK modulation, the modulated symbols $s_1(m)$ and $s_2(m)$ have values described below.

In a case where m is an odd number, $s_1(m)$ and $s_2(m)$ are placed on an I-axis and take either +1 or −1 as a value.

In a case where m is an even number, $s_1(m)$ and $s_2(m)$ are placed on a Q-axis and take either +j or −j as a value where j is an imaginary unit.

The precoder 105 multiplies the modulated symbols $s_1(m)$ and $s_2(m)$ output by the data modulators 104*a* and 104*b* by a 2-by-2 matrix as shown in equation (1) thereby determining precoded symbols $x_1(m)$ and $x_2(m)$.

$$\begin{bmatrix} x_1(m) \\ x_2(m) \end{bmatrix} = \frac{e^{-j\frac{\pi}{4}}}{\sqrt{2}} \begin{bmatrix} 1 & j \\ 1 & -j \end{bmatrix} \begin{bmatrix} s_1(m) \\ s_2(m) \end{bmatrix} \quad (1)$$

In equation (1), the 2-by-2 matrix multiplied to $s_1$(m) and $s_2$(m) is referred to as a precoding matrix (hereinafter denoted by "G"). That is, the precoding matrix G is represented by equation (2).

$$G = \frac{e^{-j\frac{\pi}{4}}}{\sqrt{2}} \begin{bmatrix} 1 & j \\ 1 & -j \end{bmatrix} \quad (2)$$

Note that the precoding matrix given by equation (2) is merely an example, and another matrix may be employed as the precoding matrix G. For example, another unitary matrix may be employed as the precoding matrix G. Note that the unitary matrix is a matrix satisfying equation (2-1). In equation (2-1), $G^H$ denotes a complex conjugate transpose of the matrix G, and I denotes an identity matrix.

$$G^H G = G G^H = I \quad (2\text{-}1)$$

The precoding matrix G in equation (2) satisfies equation (2-1), and thus the precoding matrix G in equation (2) is an example of a unitary matrix.

In a case where the precoding matrix G in equation (2) is used, $x_1$(m) and $x_2$(m) satisfy a relationship expressed in equation (2-2) where a symbol "*" denotes complex conjugate.

$$x_2(m) = x_1^*(m) \quad (2\text{-}2)$$

Another example of a precoding matrix G is shown in equation (2-3).

$$G = \frac{e^{-j\frac{\pi}{4}}}{\sqrt{3}} \begin{bmatrix} 1 & j \\ 1+j & -1+j \end{bmatrix} \quad (2\text{-}3)$$

In a case where the precoding matrix G in equation (2-3) is used, $x_1$(m) and $x_2$(m) satisfy a relationship expressed in equation (2-4).

$$x_2(m) = (1+j)x_1^*(m) \quad (2\text{-}4)$$

Another example of a precoding matrix G is shown in equation (2-5). In equation (2-5), a is a constant of a real number and b is a constant of a complex number. ρ is a constant indicating an amount of phase shift.

$$G = \frac{e^{j\rho}}{\sqrt{(1+|a|^2)(1+|b|^2)/2}} \begin{bmatrix} 1 & aj \\ b & -abj \end{bmatrix} \quad (2\text{-}5)$$

In a case where the precoding matrix G in equation (2-5) is used, $x_1$(m) and $x_2$(m) satisfy a relationship expressed in equation (2-6).

$$x_2(m) = b x_1^*(m) \quad (2\text{-}6)$$

In equation (2-5), in a case where a and b are each equal to 1 and ρ is equal to −π/4, equation (2-5) is equal to equation (2).

Figure 4C:
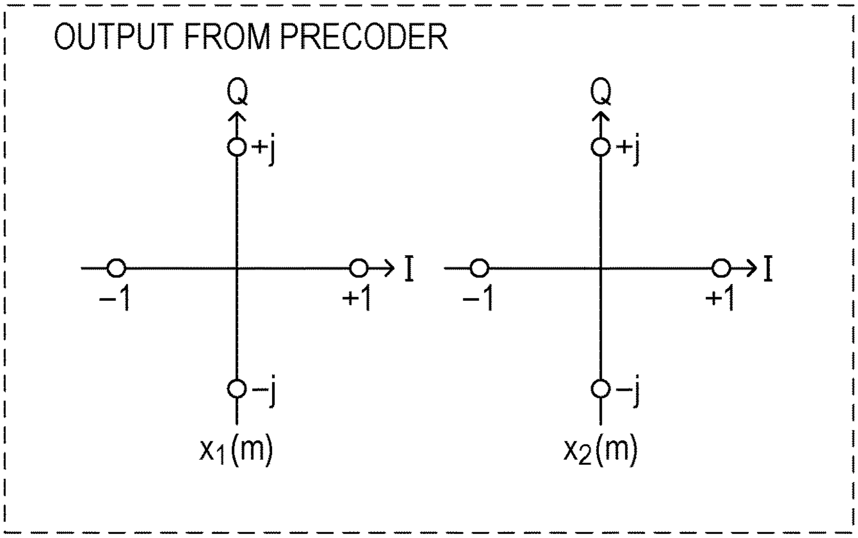
FIG. 4C is a diagram illustrating an example of a constellation of data output from a precoder.

FIG. 4C is a diagram illustrating an example of a constellation of output data $x_1$(m) and $x_2$(m) output by the precoder 105. The constellation shown in FIG. 4C is the same as the constellation in QPSK modulation. That is, the precoder 105 converts two modulated symbol $s_1$(m) and $s_2$(m) modulated by the π/2-BPSK into two precoded symbols $x_1$(m) and $x_2$(m) corresponding to QPSK symbols according to equation (1).

A process performed on the precoded symbol $x_1$(m) output from the precoder 105 is referred to as a first transmission RF chain process. The first transmission RF chain process is performed by the GI adder 106*a*, the data symbol buffer 108*a*, the transmission F/E (Front End) circuit 110*a*, and the transmitting antenna 111*a*.

A process performed on the precoded symbol $x_2$(m) output from the precoder 105 is referred to as a second transmission RF chain process. The second transmission RF chain process is performed by the complex conjugate GI adder 106*b*, the symbol order reverser 107, the data symbol buffer 108*b*, the phase shifter 109, the transmission F/E circuit 110*b*, and the transmitting antenna 111*b*.

Figure 5A:
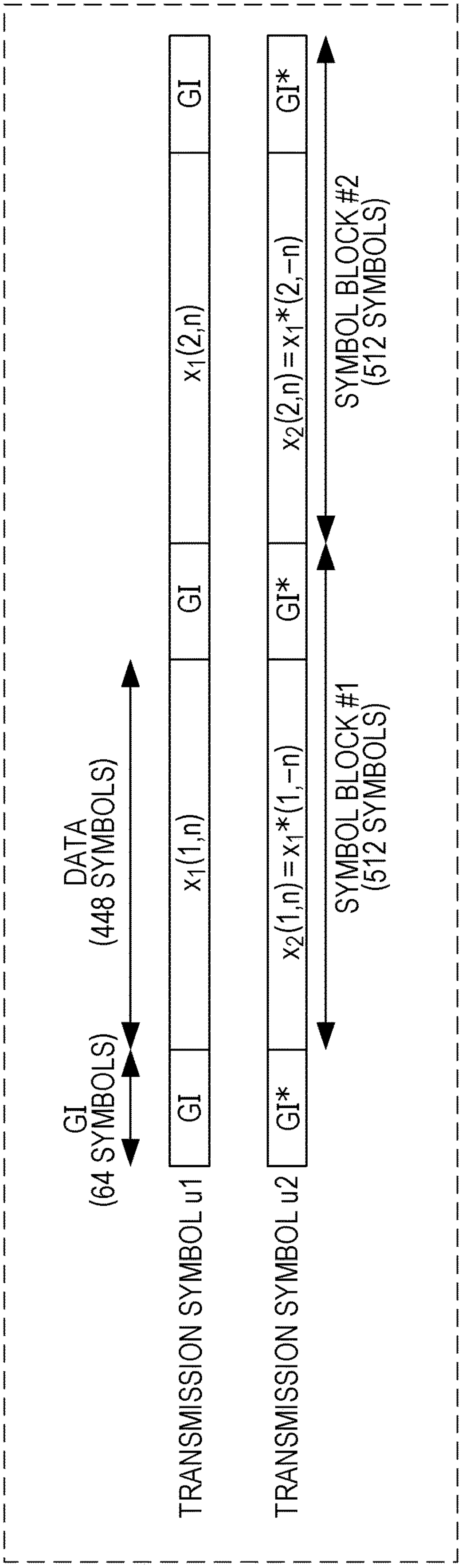
FIG. 5A is a diagram illustrating an example of a method of adding GI.

FIG. 5A is a diagram illustrating an example of a method of adding GI by the GI adder 106*a* and the complex conjugate GI adder 106*b*.

The GI adder 106*a* divides the precoded symbol $x_1$(m) into data blocks each including 448 symbols. For example, first 448 symbols in $x_1$(m) are put into a first data block ($x_1$(1, n)), next 448 symbols are put into a second data block ($x_1$(2, n)), . . . , and b-th 448 symbols are put into a b-th data block ($x_1$(b, n)). Note that in the present embodiment, n is an integer greater than or equal to 1 and smaller than or equal to 448, and b is a positive integer. That is, $x_1$(b, n) denotes an n-th precoded symbol in a b-th data block. Note that the numbers of symbols employed above are merely examples, and the numbers of symbols in the present embodiment may be different from these examples.

The GI adder 106*a* adds a 64-symbol GI in front of each data block. The GI is a symbol sequence obtained as a result of performing π/2-BPSK modulation on a known sequence. Furthermore, the GI adder 106*a* adds a 64-symbol GI after a last data block. As a result, a transmission symbol u1 such as that shown in FIG. 5A is generated.

Similarly, the complex conjugate GI adder 106*b* divides the precoded symbol $x_2$(m) into data blocks each including 448 symbols, adds a 64-symbol GI in front of each data block, and adds a 64-symbol GI after a last data block. However, the GIs added by the complex conjugate GI adder 106*b* are complex conjugates of the GIs added by the GI adder 106*a*. As a result, a transmission symbol u2 such as that shown in FIG. 5A is generated.

Here, let $GI_1$(p) denote a p-th symbol in the GI added by the GI adder 106*a*, and let $GI_2$(p) denote a p-th symbol in the GI added by the complex conjugate GI adder 106*b*. Note that in the present embodiment, p is an integer greater than or equal to 1 and smaller than or equal to 64. In this case, $GI_1$(p) and $GI_2$(p) have a relationship described in equation (3), where a symbol "*" denotes complex conjugate.

$$GI_2(p) = GI_1^*(p) \quad (3)$$

Figure 5B:
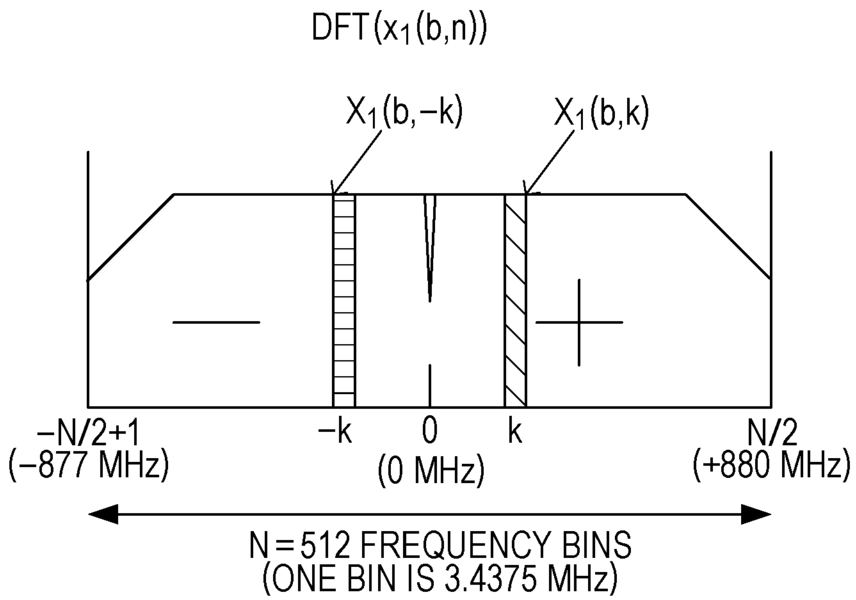
FIG. 5B is a diagram illustrating an example of a DFT signal obtained as a result of performing DFT on symbol blocks including precoded symbols and added GIs.
Figure 5C:
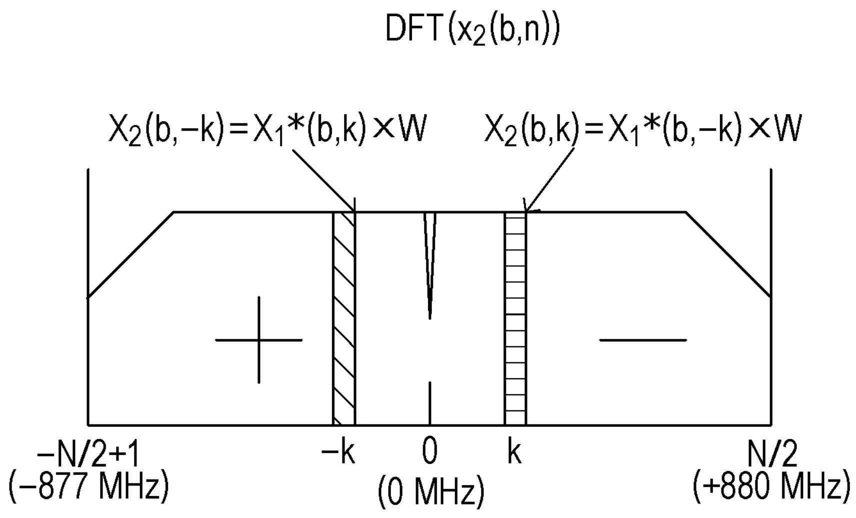
FIG. 5C is a diagram illustrating an example of a DFT signal obtained as a result of performing DFT on symbol blocks including precoded symbols and added GI*.

FIG. 5B illustrates an example of a DFT signal $X_1$(b, k) obtained as a result of performing a DFT (Discrete Fourier Transform) on a symbol block (refer to the transmission symbol u1 in FIG. 5A) obtained by adding GI(p) to a precoded symbol $x_1$(b, n). FIG. 5C illustrates an example of a DFT signal $X_2$(b, k) obtained as a result of performing a DFT on a symbol block (refer to the transmission symbol u2 in FIG. 5A) obtained by adding GI*(p) to a precoded symbol $x_2$(b, n). Next, a frequency characteristic of a signal output by the GI adder 106*a* is explained below with reference to the DFT signal $X_1$(b, k). A frequency characteristic of a signal output by the GI adder 106*b* is also explained below with reference to the DFT signal $X_2(b, k)$.

In the case where the precoding matrix G in equation (2) is used, $x_2(b, n)$ and $GI^*(p)$ are respectively complex conjugates of $x_1(b, n)$ and $GI(p)$, and thus the DFT signal $X_2(b, k)$ is a signal obtained by performing frequency inversion on the complex conjugate of the DFT signal $X_1(b, k)$ and further performing phase shifting in frequency domain. That is, $X_2(b, k)$ is represented by equation (3-1).

$$X_2(b, k) = X_1^*(b, -k) \cdot e^{j\frac{2\pi k}{N}} \tag{3-1}$$

The amount of phase shift ($\exp(j\times 2\pi k/N)$) in equation (3-1) is denoted by W as shown below.

$$W = e^{j\frac{2\pi k}{N}} \tag{3-2}$$

By performing the precoding process, it is possible to interweave the two modulated symbols $s_1(m)$ and $s_2(m)$ and transmit them using two different transmitting antennas, which makes it possible to achieve a space diversity effect. Furthermore, by performing the precoding process, it is possible to interweave the two modulated symbols $s_1(m)$ and $s_2(m)$ and transmit them using two different frequency indices k and −k, which makes it possible to achieve a frequency diversity effect.

In FIG. 5B and FIG. 5C, in a case where the absolute value |k| of two different frequency indices k and −k is small, the two frequencies are located close to each other, and thus a reduction in the frequency diversity effect occurs. An explanation is given below as to a technique of suppressing a reduction in the frequency diversity effect in a situation in which two frequencies are located close to each other.

Figure 6A:
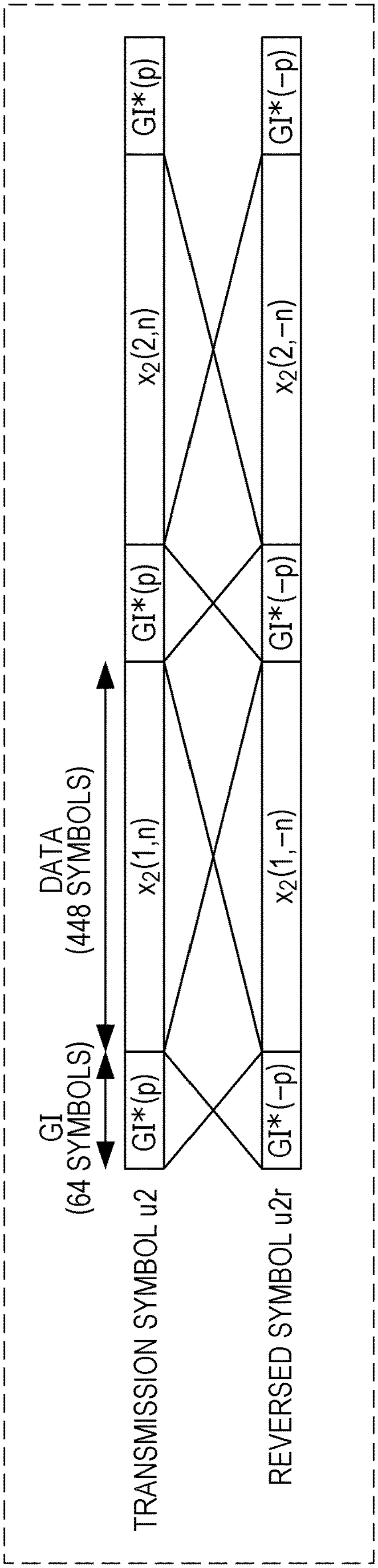
FIG. 6A illustrates an example of a symbol order reversion process performed by a symbol order reverser.

FIG. 6A illustrates an example of a symbol order reversion process performed by the symbol order reverser 107.

As shown in FIG. 6A, the symbol order reverser 107 reverses the order of the precoded symbol $x_2(b, n)$ in each symbol block, and also reverse the order of GI(p) added to the precoded symbol $x_2(b, n)$. For simplicity, the precoded symbol $x_2^{(time\ reversal)}(b, n)$ obtained as a result of reversing the order is represented by equation (4). That is, the symbol sequence reversed in order is denoted by "−n".

$$x_2^{(time\ reversal)}(b,n)=x_2(b,-n)=x_2(b,448-n+1) \tag{4}$$

On the other hand, $GI_2^{(time\ reversal)}(p)$ reversed in order is represented by equation (5). That is, the symbol sequence reversed in order is denoted by "−p".

$$GI_2^{(time\ reversal)}(p)=GI_2(-p)=GI_2(64-p+1) \tag{5}$$

Figure 6B:
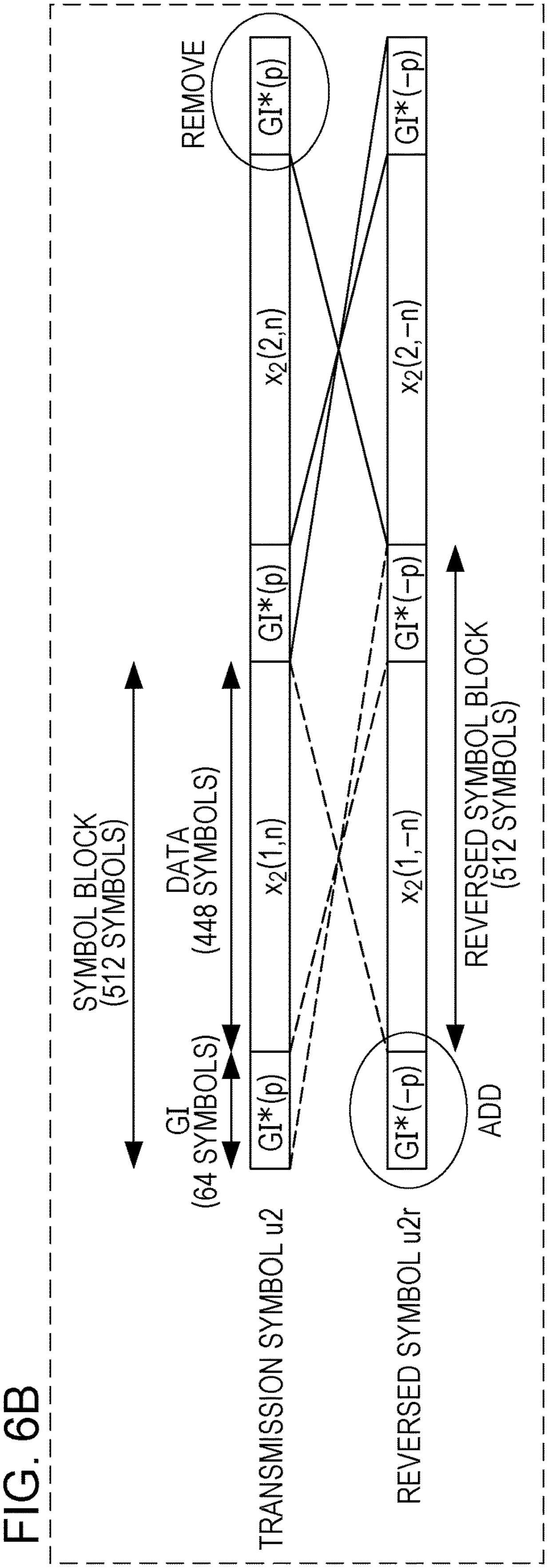
FIG. 6B illustrates another example of a symbol order reversion process performed by a symbol order reverser.
Figure 6C:
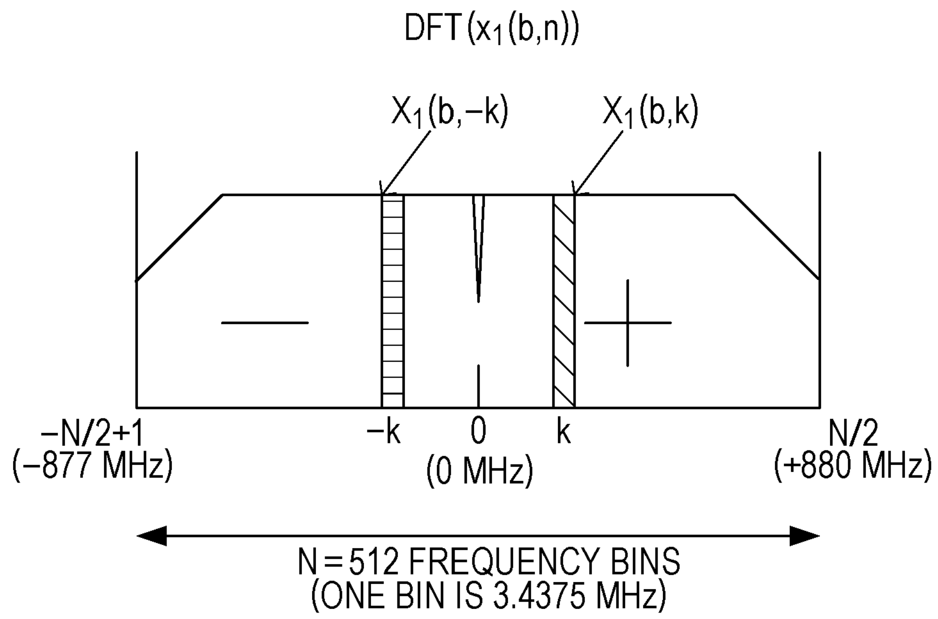
FIG. 6C is a diagram illustrating an example of a DFT signal obtained as a result of performing DFT on symbol blocks including precoded symbols and added GIs.
Figure 6D:
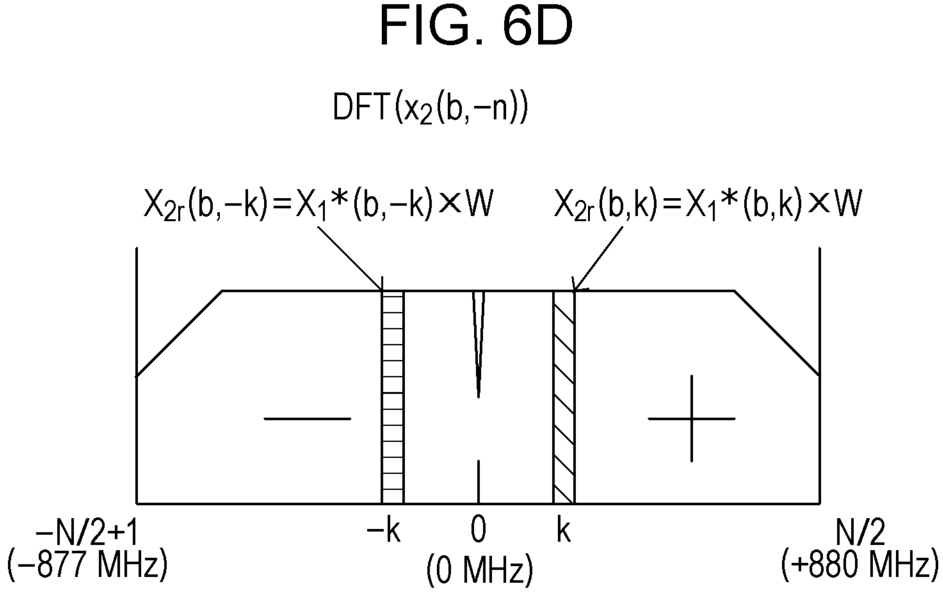
FIG. 6D is a diagram illustrating an example of a reversed DFT signal obtained as a result of performing DFT on a reversed symbol.

FIG. 6C illustrates an example of a DFT signal $X_1(b, k)$ obtained as a result of performing DFT on a symbol block (refer to the transmission symbol u1 in FIG. 5A) obtained by adding GI(p) to the precoded symbol $x_1(b, n)$. FIG. 6C is similar to FIG. 5B. FIG. 6D illustrates an example of a reversed DFT signal $X_{2r}(b, k)$ obtained as a result of performing DFT on a reversed symbol $x_2(-m)$. Herein, the reversed symbol $x_2(-m)$ includes a precoded symbol signal $x_2(b, -n)$ obtained as a result of performing symbol order reversion and $GI^*(-p)$ obtained as a result of performing symbol order reversion on the complex conjugate of GI. Next, a frequency characteristic of a signal output by the symbol order reverser 107 is explained below with reference to the reversed DFT signal $X_{2r}(b, k)$.

In the case where the precoding matrix G in equation (2) is used, $x_2(b, -n)$ and $GI^*(-p)$ are respectively complex conjugates of symbol blocks obtained as a result of performing the order reversion on $x_1(b, n)$ and $GI(p)$, and thus $X_{2r}(b, k)$ is represented by equation (5-2).

$$X_{2r}(b,k)=X_1^*(b,k)\cdot W \tag{5-2}$$

The reversed DFT signal $X_{2r}(b, k)$ is a signal obtained as a result of applying a phase shift to the complex conjugate of the DFT signal $X_1(b, k)$. Note that in equation (5-2), N included in W is a DFT size (for example, a length "512" of a symbol block).

In the examples shown in FIG. 6C and FIG. 6D, unlike the examples shown in FIG. 5B and FIG. 5C, the DFT signal $X_1(b, k)$ subjected to the first transmission RF chain process and the reversed DFT signal $X_{2r}(b, k)=X_1^*(b, k)\times W$ subjected to the second transmission RF chain process are transmitted with the same frequency index k, which makes it possible to achieve a space diversity effect.

FIG. 6B illustrates another example of a symbol order reversion process performed by the symbol order reverser 107.

As shown in FIG. 6B the symbol order reverser 107 reverses the order of a symbol sequence (a sequence of symbols) in each whole symbol block. In this process, to put GI in the symbol block such the location of the GI is the same before and after the symbol order reversion is performed, the symbol order reverser 107 may remove GI added at the location after the last data block and may add a symbol-order-reversed GI in front of the first data block. Note that the symbol block is, for example, as described above, a 512-symbol block obtained by combining a 64-symbol GI and a 448-symbol data block.

The symbol order reverser 107 may sequentially store data symbols in the transmission symbol u2 output by the complex conjugate GI adder 106*b* in the data symbol buffer 108*b* such that 448 symbols are stored at a time, and may read data symbols in an order different from (in an order opposite to) the order in which data symbols are stored in the data symbol buffer 108*b* thereby reversing the order of symbols. That is, the data symbol buffer 108*b* may be of a type of a LIFO (Last In, First Out) buffer. The data symbol buffer 108*b* may be a memory, a RAM, a register, or the like.

The process performed by the symbol order reverser 107 to reverse the symbol order of the transmission symbol u2 causes output data to have a delay with respect to input data. To handle the above situation, using the data symbol buffer 108*a*, a delay with a length equal to the delay that occurs in the symbol order reverser 107 is applied to a data symbol (for example, $x_2(b, n)$) in the transmission symbol u2 output by the GI adder 106*a*. As a result, the transmission symbol u1 output by the GI adder 106*a* and the transmission symbol u2 output by the complex conjugate GI adder 106*b* are transmitted at the same timing. Note that in the following description, a symbol block obtained by reversing the transmission symbol u2 by the symbol order reverser 107 is also referred to as a reversed symbol u2*r*.

The phase shifter 109 applies a different phase shift to each data symbol (for example, $x_2(b, n)$) in the reversed symbol u2*r* output by the symbol order reverser 107. That is, the phase shifter 109 changes phases of symbols by different amounts depending on the symbols. The phase shifter 109 applies a phase shift to a data symbol (for example, $x_2(b, n)$) according to equation (6), and applies a phase shift to GI (for example, $GI_2(p)$) according to equation (7). Note that in equation (6) and equation (7), θ denotes the amount of phase shift.

$$t_2(b,n)=e^{j\theta n}x_2(b,-n) \tag{6}$$

$$GI_2(p)=e^{j\theta p}GI_2(-p) \tag{7}$$

The transmission apparatus 100 does not give a phase shift to $x_1(b, n)$ in transmission symbols output by the precoder 105 but gives a phase shift to $x_2(b, n)$ in the transmission symbols output by the precoder 105. The transmission symbol obtained as a result of the phase shift is represented by equation (8).

$$\begin{bmatrix} t_1(b,n) \\ t_2(b,n) \end{bmatrix} = \begin{bmatrix} 1 & 0 \\ 0 & e^{j\theta n} \end{bmatrix} \begin{bmatrix} x_1(b,n) \\ x_2(b,-n) \end{bmatrix} \tag{8}$$

Although in FIG. 3, the phase shifter 109 is provided in the second transmission RF chain process, a phase shifter may be provided in both the first transmission RF chain process and the second transmission RF chain process. In a case where this configuration is employed, a phase shift matrix shown in equation (9) may be used.

$$P = \begin{bmatrix} 1 & 0 \\ 0 & e^{j\theta n} \end{bmatrix} \tag{9}$$

Note that in a case where n in equation (8) is greater than or equal to 1 and smaller than or equal to 448, this equation may be regarded as an equation in terms of a data symbol (for example equation (6)), while in case where n is greater than or equal to 449 and smaller than or equal to 512, the equation may be regarded as an equation in terms of GI (for example, equation (7) for a case where p is given by a value obtained as a result of subtracting 448 from n in equation (8)). In this case, in equation (8), n is greater than or equal to 1 and smaller than or equal to 512, and $x_1(b, n)$ and $x_2(b, -n)$ include both a data symbol and GI.

Figure 6E:
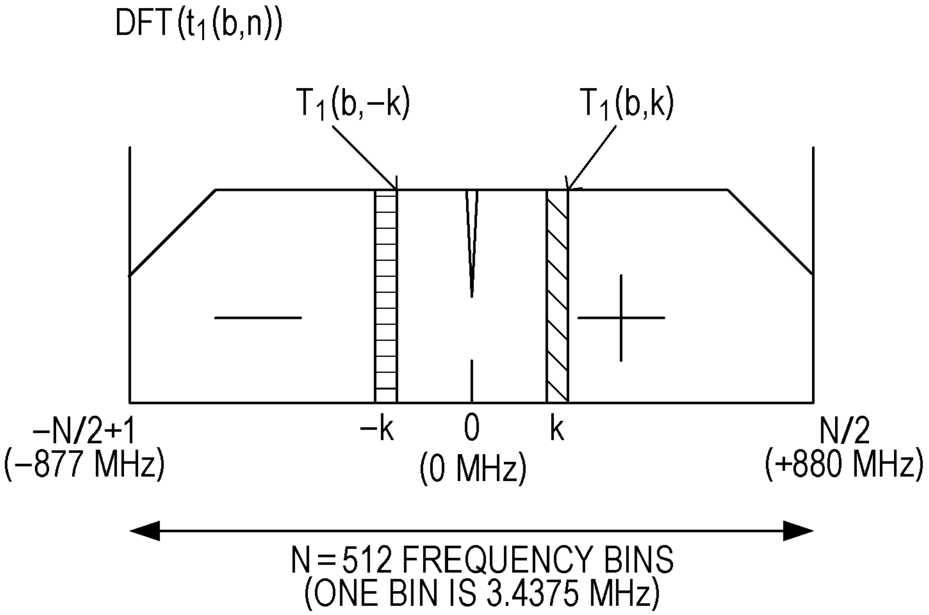
FIG. 6E is a diagram illustrating an example of a DFT signal obtained as a result of performing DFT on phase-shifted symbols on a symbol block-by-symbol block basis.
Figure 6F:
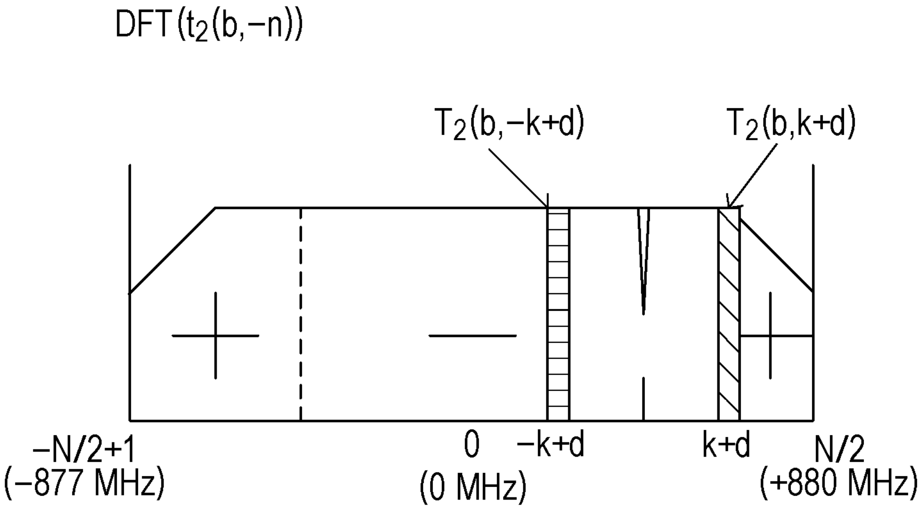
FIG. 6F is a diagram illustrating an example of a DFT signal obtained as a result of performing DFT on phase-shifted symbols on a symbol block-by-symbol block basis.

FIG. 6E is a diagram illustrating a DFT signal $T_1(b, k)$ obtained by performing DFT on the phase-shifted symbol $t_1(b, n)$ on a symbol block-by-symbol block basis. FIG. 6F is a diagram illustrating a DFT signal $T_2(b, k)$ obtained by performing DFT on the phase-shifted symbol $t_2(b, n)$ on a symbol block-by-symbol block basis. Next, a frequency characteristic of a phase-shifted signal is explained below with reference to $T_1(b, k)$ and $T_2(b, k)$.

Equation (8) indicates that $X_1(b, k)$ and $T_1(b, k)$ are equal to each other. That is, FIG. 6C and FIG. 6E are the same except that a symbol $X_1$ is replaced by a symbol $T_1$.

$T_2(b, k)$ shown in FIG. 6F is a signal obtained by applying a phase shift in time domain to $X_{2r}(b, k)$. When a phase shift is given in time domain according to equation (8), the frequency index is shifted in frequency domain by an amount corresponding to a frequency bin d calculated according to equation (9-1). N is a DFT size (for example, a length "512" of a symbol block).

$$d=N\theta/2\pi \tag{9-1}$$

Thus, $X_1(b, k)$ is transmitted as $T_1(b, k)$ and $T_2(b, k+d)$ according to equation (9-2) using two transmitting antennas and two frequency indices k and k+d. Thus, a space diversity effect and a frequency diversity effect are obtained.

$$\begin{cases} T_1(b,k) = X_1(b,k) \\ T_2(b,k+d) = X_{2r}(b,k) = X_1^*(b,k)\cdot W \end{cases} \tag{9-2}$$

The transmission apparatus 100 is capable of enhancing the frequency diversity effect and the data throughput by setting the amount of phase shift θ to a value close to π radian (180°) or −π radian (−180°).

Note that the transmission apparatus 100 may set the amount of phase shift θ to a value different from π radian (180°). This makes it possible to easily achieve a signal separation between the transmission signal associated with the transmitting antenna 111*a* and the transmission signal associated with the transmitting antenna 111*b*. Furthermore, it is also possible to increase the data throughput.

A method of giving a phase shift other than π radian to a transmission symbol in OFDM is disclosed, as a PH (Phase Hopping) technique, in NPL 2. However, in the transmission apparatus 100 according to the present disclosure, unlike the case of NPL 2, single carrier transmission is used, and symbol order reversion is performed in the second transmission stream process. This makes it possible to easily separate two transmission signals from each other. Furthermore, a relatively high frequency diversity effect is achieved.

The transmission apparatus 100 may set the amount of phase shift θ to a value such as −7π/8 radian (d is −224), −15π/16 radian (d is 240), or the like.

The transmission F/E circuits 110*a* and 110*b* include digital and analog filters, a D/A converter, and an RF (radio) circuit. The transmission F/E circuit 110*a* converts transmission data v1 (a signal including GI(p) and t1(*b, n*) shown in FIG. 8) output from the data symbol buffer 108*a* to a radio signal, and outputs the resultant radio signal to the transmitting antenna 111*a*. The transmission F/E circuit 110*b* converts transmission data v2 (a signal including GI*(−p) and t2(*b*, −n) shown in FIG. 8) output from the phase shifter 109 to a radio signal, and outputs the resultant radio signal to the transmitting antenna 111*b*.

The transmitting antenna 111*a* transmits the radio signal output from the transmission F/E circuit 110*a*. The transmitting antenna 111*b* transmits the radio signal output from the transmission F/E circuit 110*b*. That is, the transmitting antennas 111*a* and 111*b* respectively transmit different radio signals.

As described above, the transmission apparatus 100 performs the precoding on two pieces of transmission stream data and then performs the symbol order reversion and the phase shift on one of the two pieces of transmission stream data. This makes it possible to enhance the space diversity effect and the frequency diversity effect. Furthermore, it is also possible to reduce the error rate in data communication and enhance the data throughput.

Figure 7:
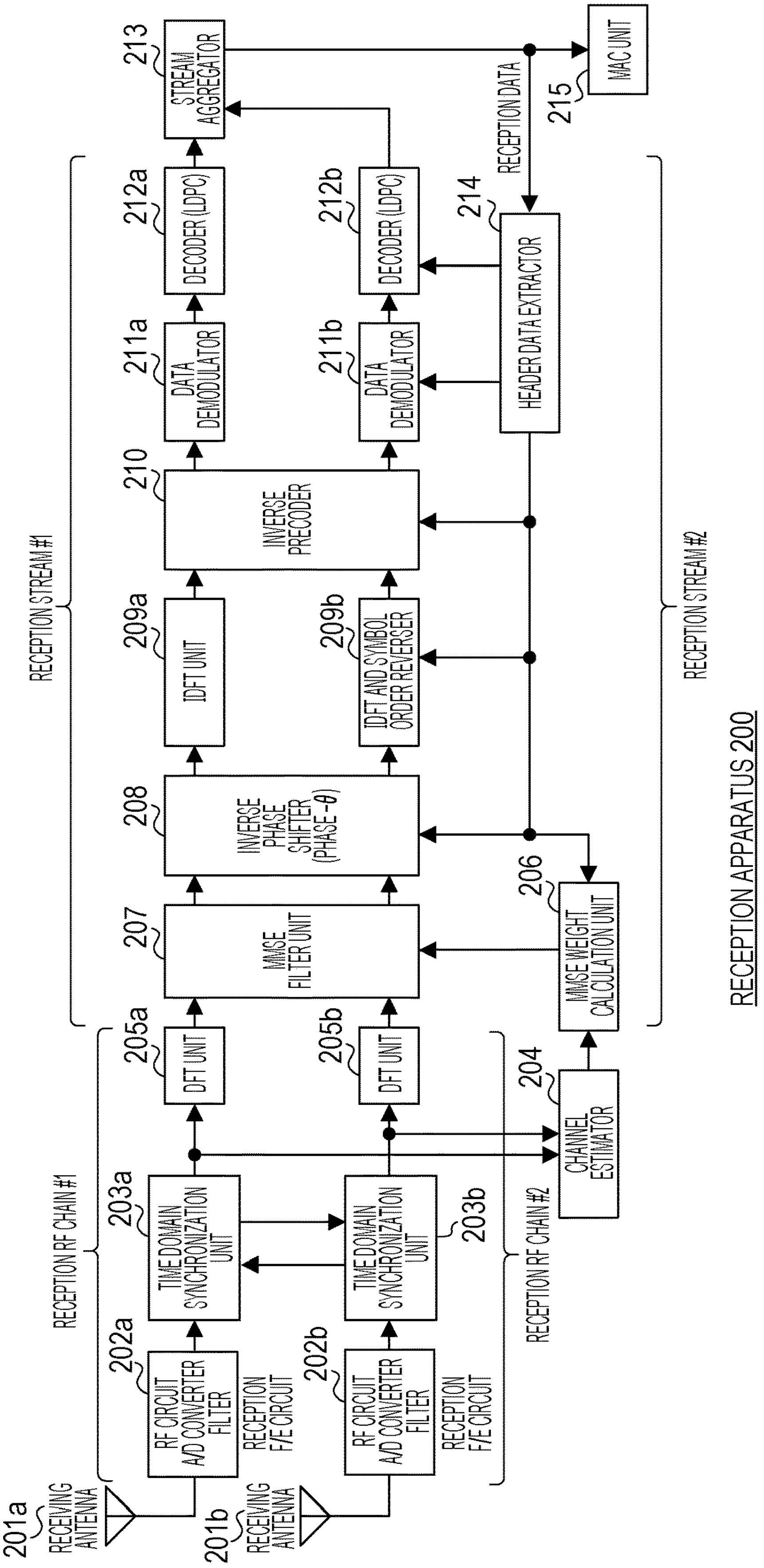
FIG. 7 is a diagram illustrating an example of a configuration of a reception apparatus.

FIG. 7 is a diagram illustrating a configuration of a reception apparatus 200.

Receiving antennas 201*a* and 201*b* respectively receive radio signals. A process performed on a reception signal received by the receiving antenna 201*a* is referred to as a first reception RF chain process. The first reception RF chain process is performed by a reception F/E circuit 202*a*, a time domain synchronization unit 203*a*, and a DFT unit 205*a*. A process performed on a reception signal received by the receiving antenna 201*b* is referred to as a second reception RF chain process. The second reception RF chain process is performed by a reception F/E circuit 202*b*, the time domain synchronization unit 203*b*, and a DFT unit 205*b*.

The reception F/E circuits 202*a* and 202*b* include, for example, an RF circuit, an A/D converter, a digital filter, an analog filter, and a down sampling unit, and the reception F/E circuits 202*a* and 202*b* convert radio signals into digital baseband signals.

The time domain synchronization units 203*a* and 203*b* perform control to achieve timing synchronization of reception packets. Note that the time domain synchronization unit 203*a* and the time domain synchronization unit 203*b* may exchange timing information with each other and may achieve timing synchronization between the first reception RF chain process and the second reception RF chain process.

A channel estimator 204 calculates a frequency response of a radio channel between the transmission apparatus and the reception apparatus using the reception signal associated with the first reception RF chain process and the reception signal associated with the second reception RF chain process. That is, $H_{11}(k)$, $H_{12}(k)$, $H_{21}(k)$, and $H_{22}(k)$ in FIG. 1 are calculated for each frequency index k.

Figure 8:
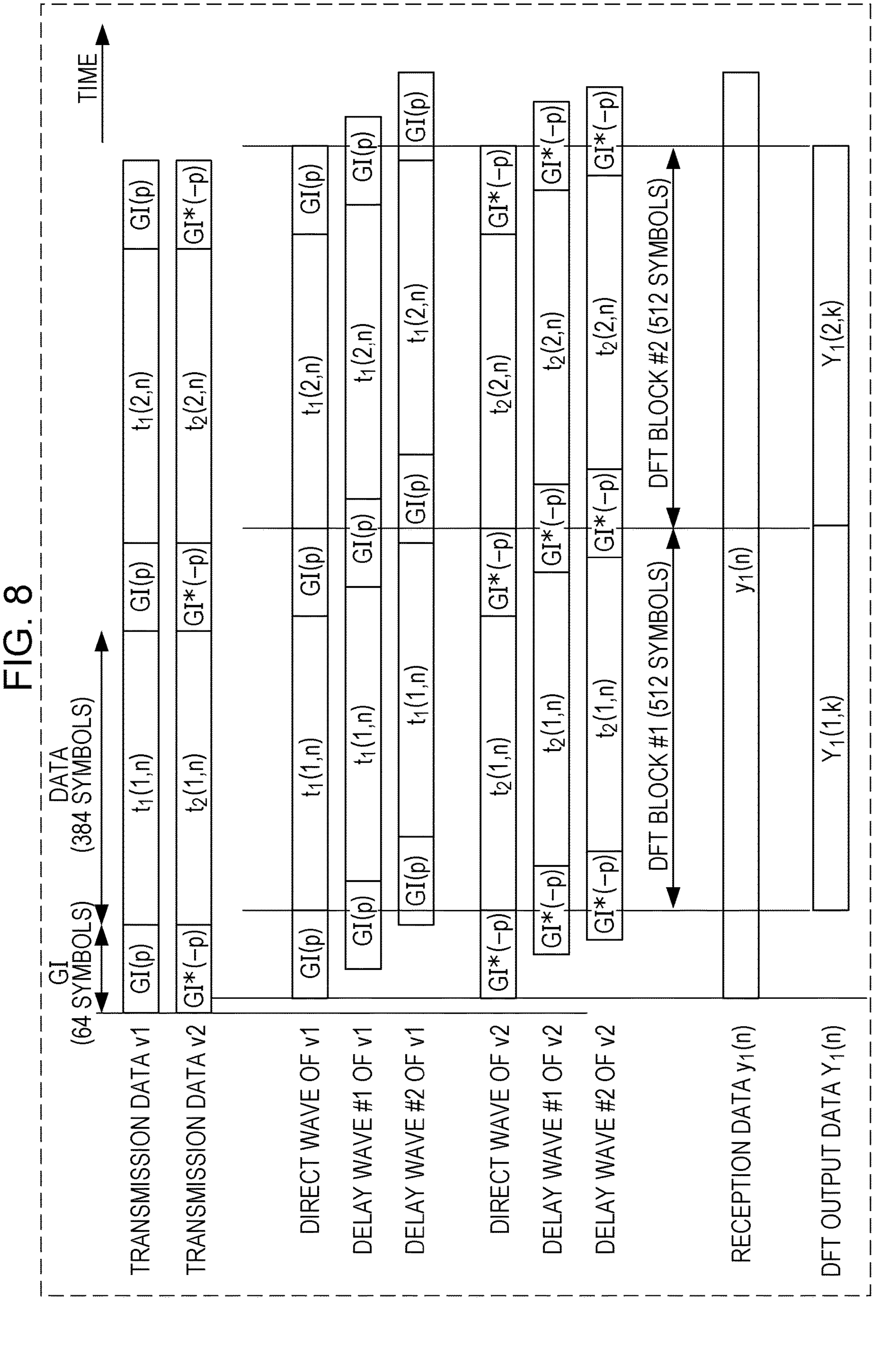
FIG. 8 is a diagram illustrating a method of dividing reception data into DFT blocks by a DFT unit.

The DFT units 205*a* and 205*b* divide the reception data into DFT blocks and perform DFT. Each DFT block includes, for example, 512 symbols. FIG. 8 is a diagram illustrating a method of dividing reception data into DFT blocks by the DFT units 205*a* and 205*b*.

Let $y_1(n)$ denote reception data subjected to the first reception RF chain process (input data applied to the DFT unit 205*a*), and let $y_2(n)$ denote reception data subjected to the second reception RF chain process (input data applied to the DFT unit 205*b*). Next, referring to FIG. 8, a process performed on $y_1(n)$ is explained. Note that a process performed on $y_2(n)$ is similar to that performed on $y_1(n)$.

As described above, the transmission apparatus 100 transmits two radio signals (transmission data v1 and transmission data v2 shown in FIG. 8) using the two transmitting antennas 111*a* and 111*b*. Note that there is a possibility that the two radio signals each create, in a channel, a direct wave and a plurality of delay waves, which arrive at the receiving antennas 201*a* and 201*b*.

Note that the reception signals each may include, for example, a diffracted wave and a scattered wave in addition to the direct wave and the delay waves.

The DFT unit 205*a* determines a first DFT block time such that a direct wave and a delay wave of a data block $t_1(1, n)$ of transmission data v1 and data block $t_2(1, n)$ of a transmission data v2 are included. A result of DFT calculation of the first DFT block is denoted as $Y_1(1, k)$, where k indicates, as described above, a frequency index and is an integer, for example, greater than or equal to 1 and smaller than or equal to 512.

Similarly, results of DFT calculations of a b-th DFT block calculated by the DFT units 205*a* and 205*b* are respectively denoted as $Y_1(b, k)$ and $Y_2(b, k)$ (b is an integer greater than 1).

The reception apparatus 200 calculates estimated values of the transmitted modulated symbols $s_1(n)$ and $s_2(n)$ using an MMSE weight calculation unit 206, an MMSE filter 207, an inverse phase shifter 208, an IDFT (inverse DFT) unit 209*a*, an IDFT and symbol order reverser 209*b*, and an inverse precoder 210. Next, a method of calculating estimated values of transmitted modulated symbols $s_1(n)$ and $s_2(n)$ is explained.

The output signals $Y_1(b, k)$ and $Y_2(b, k)$ output from the DFT units 205*a* and 205*b* in the reception apparatus 200 are represented using channel values as equation (10).

$$\begin{cases} Y_1(b,k) = H_{11}(k)T_1(b,k) + H_{12}(k)T_2(b,k) + Z_1(b,k) \\ Y_2(b,k) = H_{21}(k)T_1(b,k) + H_{22}(k)T_2(b,k) + Z_2(b,k) \end{cases} \tag{10}$$

In equation (10), $T_1(b, k)$ is a signal obtained as a result of performing DFT on a symbol block ($t_1(b, n)$ in equation (8)) in the transmission apparatus 100. $T_2(b, k)$ is a signal obtained as a result of performing DFT on a symbol block ($t_2(b, n)$ in equation (8)) in the transmission apparatus 100. $Z_1(b, k)$ is a signal obtained as a result of performing DFT on noise in the first RF chain unit. $Z_2(b, k)$ is a signal obtained as a result of performing DFT on noise in the second RF chain unit.

Equation (10) can be expressed using matrices as in equation (11).

$$\begin{bmatrix} Y_1(b,k) \\ Y_2(b,k) \end{bmatrix} = H_{2\times2}(k)\begin{bmatrix} T_1(b,k) \\ T_2(b,k) \end{bmatrix} + \begin{bmatrix} Z_1(b,k) \\ Z_2(b,k) \end{bmatrix} \tag{11}$$

In equation (11), a channel matrix $H_{2\times2}(k)$ is determined as shown in equation (12).

$$H_{2\times2}(k) = \begin{bmatrix} H_{11}(k) & H_{12}(k) \\ H_{21}(k) & H_{22}(k) \end{bmatrix} \tag{12}$$

The MMSE weight calculation unit 206 calculates a weight matrix $W_{2\times2}(k)$ according to equation (12-1).

$$W_{2\times2}(k)=H_{2\times2}{}^{H}(k)(H_{2\times2}(k)H_{2\times2}{}^{H}(k)+\sigma^2 I_{2\times2})^{-1} \tag{12-1}$$

In equation (12-1), $H^H$ denotes a complex conjugate transpose of a matrix H, $\sigma^2$ is the variance of noise $Z_1(b, k)$ and noise $Z_2(b, k)$, and $I_{2\times2}$ is a 2-by-2 identity matrix.

The MMSE filter 207 calculates estimated values $T\hat{}_1(b, k)$ and $T\hat{}_2(b, k)$ of $T_1(b, k)$ and $T_2(b, k)$ according to equation (12-2). Note that a process associated with the estimated value $T\hat{}_1(b, k)$ is referred to as a first reception stream process, and a process associated with the estimated value $T\hat{}_2(b, k)$ is referred to as a second reception stream process.

$$\begin{bmatrix} \hat{T}_1(b,k) \\ \hat{T}_2(b,k) \end{bmatrix} = W_{2\times2}(k)\begin{bmatrix} Y_1(b,k) \\ Y_2(b,k) \end{bmatrix} \tag{12-2}$$

The calculation according to equation (12-2) is referred to as an MMSE algorithm. The MMSE filter 207 acquires estimated values of phase-shifted data symbols $t_1(b, n)$ and $t_2(b, n)$ based on the MMSE algorithm from reception data y1 and y2 (see FIG. 8) including a mixture of $t_1(b, n)$ included in the transmission data v1, $t_2(b, n)$ included in the transmission data v2, and direct waves and delay waves thereof. In order to make it possible to easily perform the calculation, the MMSE filter 207 performs the calculation on the frequency-domain signal as shown in equation (12-2) using estimated channel values (estimated values of channel frequency response) $H_{11}(k)$, $H_{12}(k)$, $H_{21}(k)$, and $H_{22}(k)$.

The inverse phase shifter 208 performs a process inverse to the process performed by the phase shifter 109 shown in FIG. 3. In the process performed by the phase shifter 109, in frequency domain, the frequency indices k and −k are shifted by amounts corresponding to a frequency bin d as shown in FIG. 6F where d is calculated according to equation (9-1). Therefore, the inverse phase shifter 208 shifts a frequency-domain signal of the second reception stream output from the MMSE filter 207 by an amount corresponding to −d. That is, the inverse phase shifter 208 performs a process in frequency domain according to equation (12-3).

$$\begin{cases} \hat{X}_1(b,k) = \hat{T}_1(b,k) \\ \hat{X}_2(b,k-d) = \hat{T}_2(b,k) \end{cases} \tag{12-3}$$

Note that in the reception apparatus 200, the IDFT unit 209*a* and the IDFT and symbol order reverser 209*b* may be exchanged with the inverse phase shifter 208, and an inverse phase shift may be applied after IDFT is performed on the output from the MMSE filter. In this case, the inverse phase shifter 208 performs a process in time domain according to equation (12-4).

$$\begin{bmatrix} \hat{x}_1(b,n) \\ \hat{x}_2(b,n) \end{bmatrix} = \begin{bmatrix} 1 & 0 \\ 0 & e^{-j\theta n} \end{bmatrix} \begin{bmatrix} \hat{t}_1(b,n) \\ \hat{t}_2(b,-n) \end{bmatrix} \tag{12-4}$$

That is, when the inverse phase shifter 208 gives an inverse phase shift to the second reception stream data, the inverse phase shifter 208 performs a process that is the same as the multiplication given by the matrix P defined by equation (9) because the symbol order is reversed by the IDFT and symbol order reverser 209*b*.

The IDFT unit 209*a* performs IDFT on the first reception stream data output from the inverse phase shifter 208. The IDFT and symbol order reverser 209*b* performs IDFT on the second reception stream data output from the inverse phase shifter 208 and reverses a symbol order of each DFT block.

The inverse precoder 210 multiplies an inverse matrix of the precoding matrix G used by the precoder 105 shown in FIG. 3 to the first reception stream data and the second reception stream data thereby calculating estimated values of s1(*b, n*) and s2(*b, n*). Equation (12-5) indicates the process performed by the inverse precorder 210.

$$\begin{bmatrix} \hat{s}_1(b,n) \\ \hat{s}_2(b,n) \end{bmatrix} = G^{-1} \begin{bmatrix} \hat{x}_1(b,n) \\ \hat{x}_2(b,n) \end{bmatrix} \tag{12-5}$$

Data demodulators 211*a* and 211*b* demodulate data of the estimated values of s1(*b, n*) and s2(*b, n*) output from the inverse precoder 210 thereby determining the estimated values in the form of bit data.

Decoders 212*a* and 212*b* perform LDPC error correction process on the estimated values in the form of bit data.

A stream aggregator 213 aggregates the first reception stream data and the second reception stream data and transmits a result as reception data to a MAC unit 215.

A header data extractor 214 extracts header data from the reception data, and determines, for example, MCS (Modulation and Coding Scheme) and the amount of phase shift θ used by the phase shifter 109 shown in FIG. 3. The header data extractor 214 may make control as to the precoding matrix G applied to the inverse precoder 210, as to whether the symbol reversion process is to be performed in the IDFT and the symbol order reverser 209*b*, and as to the amount of phase shift θ used by the inverse phase shifter 208.

In the reception apparatus 200, the MMSE filter 207 performs the estimation using the transmission signals $T_1$(b, k) and $T_2$(b, k) obtained as a result of performing frequency shift on the second transmission stream data, and thus it is possible to achieve further higher frequency diversity effect. Furthermore, it is possible to achieve a reduction in reception error rate and an increase in data throughput.

Effects of First Embodiment

In the first embodiment, the transmission apparatus 100 processes the second precoded symbol such that the complex conjugate of GI added to the first precoded symbol is added, the symbol order is reversed, and the phase shift (phase changing) is given.

Thus, it is possible to achieve a high frequency diversity effect in MIMO channel. It is also possible to reduce the communication data error rate and improve the data throughput.

Second Embodiment

In the first embodiment described above, the transmission apparatus 100 performs MIMO transmission by performing π/2-BPSK modulation using the data modulators 104*a* and 104*b*. In a second embodiment described below, a transmission apparatus 300 (see FIG. 9) performs MIMO transmission using data modulators 104*a* and 104*b* such that a plurality of data modulation schemes (for example, π/2-BPSK modulation and π/2-QPSK modulation) are switched.

Figure 9:
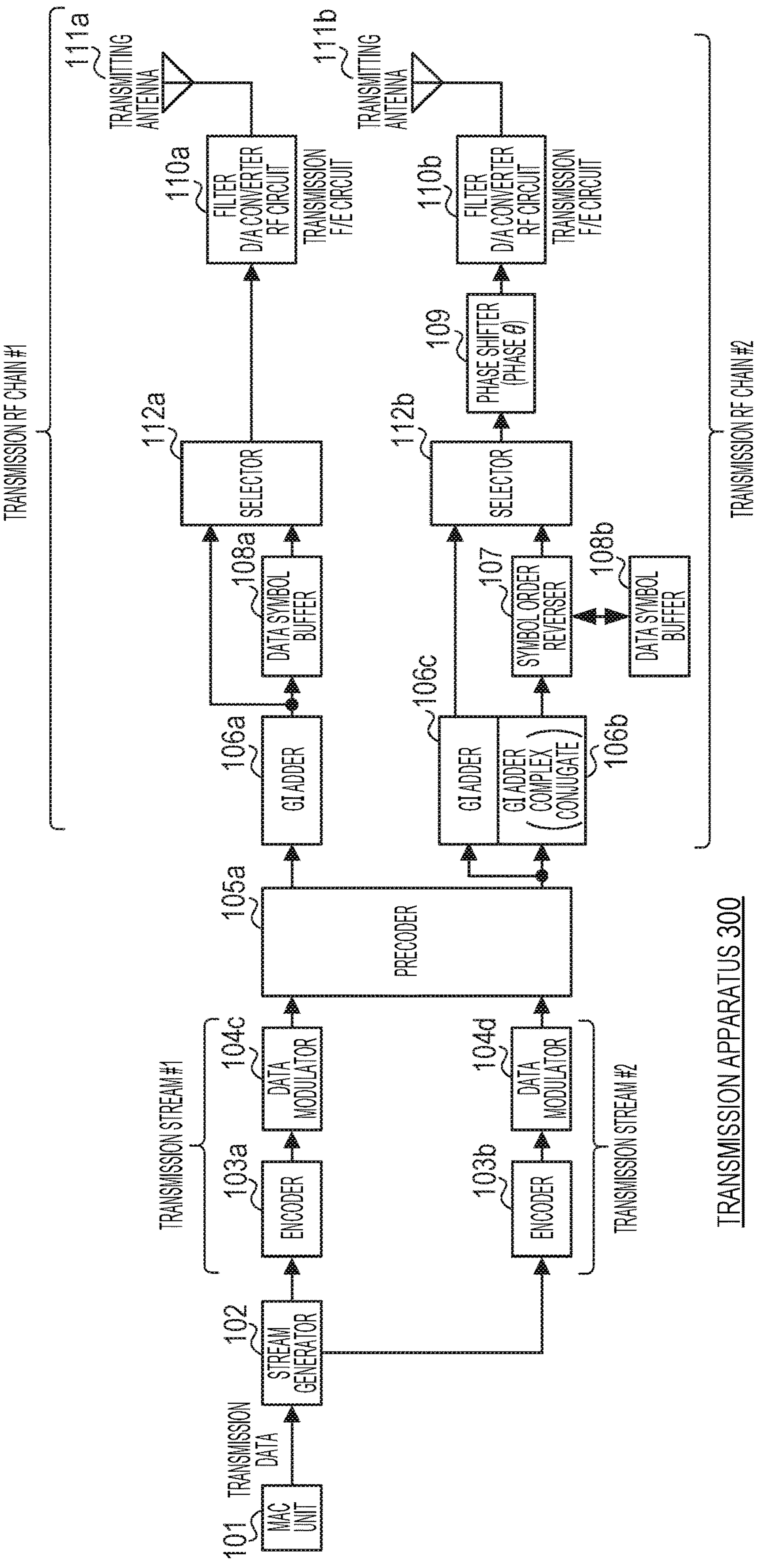
FIG. 9 is a diagram illustrating an example of a configuration of a transmission apparatus according to a second embodiment.

FIG. 9 is a diagram illustrating an example of a configuration of a transmission apparatus 300 according to the second embodiment. Note that same constituent elements as those in FIG. 3 are denoted by same numbers, and a further description thereof is omitted.

Data modulators 104*c* and 104*d* perform data modulation on encoded data output by encoders 103*a* and 103*b* under the control of a MAC unit 101.

Next, an explanation is given below as to an example in which a precoding process is switched depending on whether π/2-BPSK modulation or π/2-QPSK modulation is employed.

Figure 10A:
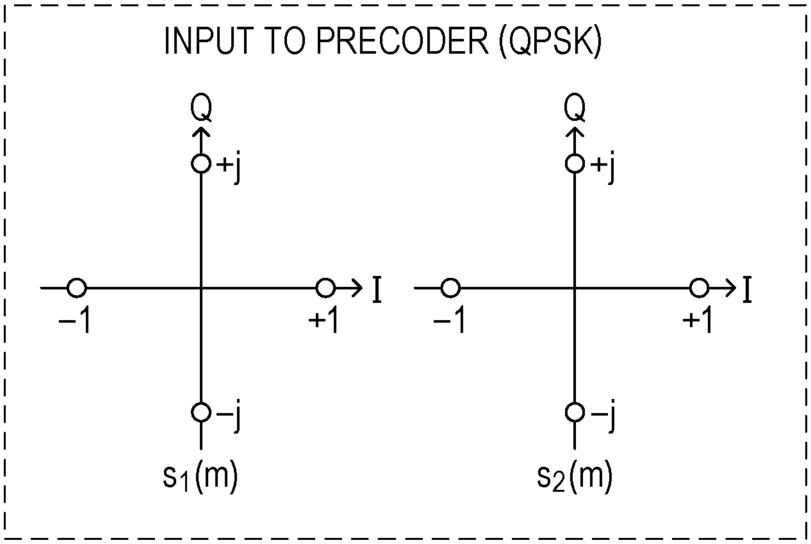
FIG. 10A is a diagram illustrating an example of a constellation for π/2-QPSK modulation.

FIG. 10A is a diagram illustrating an example of a constellation for π/2-QPSK modulation. Modulated symbols $s_1$(m) and $s_2$(m) output from the data modulators 104*c* and 104*d* each take one of values +1, −1, +j, and −j. Note that a constellation for π/2-BPSK modulation is as shown in FIG. 4A.

The precoder 105*a* changes a precoding matrix depending on a data modulation scheme used by the data modulator 104*c* or 104*d* thereby performing a precoding process shown in equation (13).

$$\begin{bmatrix} x_1(m) \\ x_2(m) \end{bmatrix} = G \begin{bmatrix} s_1(m) \\ s_2(m) \end{bmatrix} \tag{13}$$

In a case where π/2-BPSK is used by the data modulators 104*c* and 104*d*, the precoder 105*a* uses, for example, a precoding matrix G shown in equation (2), equation (2-3), or equation (2-5).

In a case where π/2-QPSK is used in the data modulators 104*c* and 104*d*, the precoder 105*a* uses, for example, a precoding matrix G shown in equation (14).

$$G = \frac{1}{\sqrt{5}} \begin{bmatrix} 1 & 2 \\ -2 & 1 \end{bmatrix} \quad (14)$$

In a case where the precoder 105*a* performs precoding on a π/2-BSPK symbol using equation (2), constellation is similar to that of π/2-QPSK (see FIG. 4C). In a case where the precoder 105*a* performs precoding on a π/2-QSPK symbol (see FIG. 10A) using equation (14), constellation is similar to that of 16QAM (see FIG. 10B).

The number of symbol candidate points in π/2-BPSK is 2, the number of symbol candidate points in π/2-QPSK is 4, and the number of symbol candidate points in π/2-16QAM is 16. That is, precoding results in an increase in the number of symbol candidate points in constellation.

A second transmission RF chain process is performed differently depending on the modulation scheme and the type of the precoding matrix G. In a case where π/2-BPSK is used in the data modulators 104*c* and 104*d* and a precoding matrix G shown in equation (2), equation (2-3), or equation (2-5) is used in the precoder 105*a*, the transmission apparatus 300 performs the second transmission RF chain process using a complex conjugate GI adder 106*b* and a symbol order reverser 107 as with the transmission apparatus 100 shown in FIG. 3.

The complex conjugate GI adder 106*b* adds a complex conjugate of GI to an output $x_2(m)$ output from the precoder 105*a*. The symbol order reverser 107 performs a symbol order reversion process on the output $x_2(n)$ added with the complex conjugate of GI.

Figure 13:
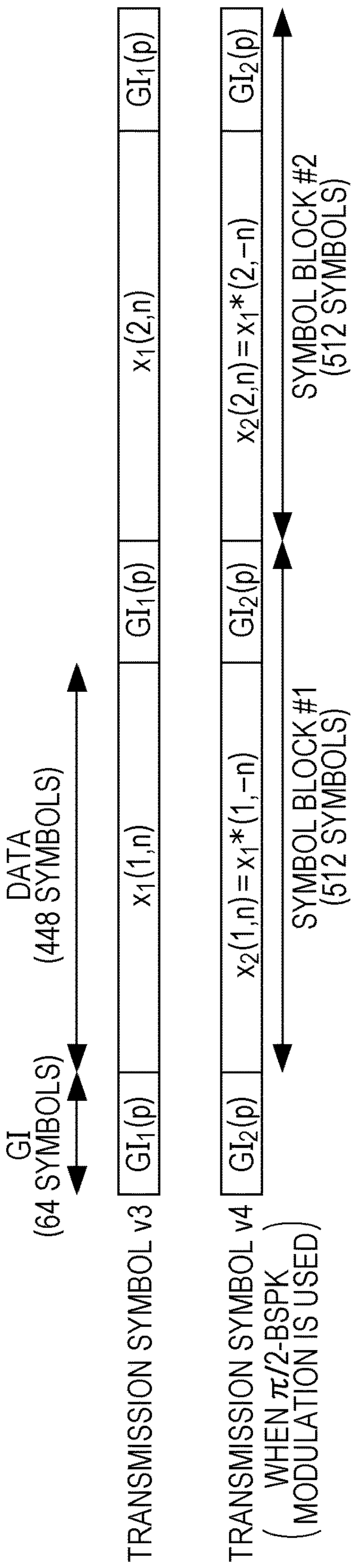
FIG. 13 is a diagram illustrating an example of a GI addition method according to the modification of the second embodiment.

In a case where π/2-QPSK is used in the data modulators 104*c* and 104*d* and a precoding matrix G shown in equation (14) is used in the precoder 105*a*, the transmission apparatus 300, unlike the transmission apparatus 100 shown in FIG. 13, performs the second transmission RF chain process using a GI adder 106*c*.

The GI adder 106*c* adds, to the output $x_2(m)$ output from the precoder 105*a*, the same GI as the GI added by the GI adder 106*a* in the first RF chain process.

Note that the GI adder 106*c* may add GI (GI2) which is different from GI(GI1) added by the GI adder 106*a*. Sequences which are orthogonal to each other (cross-correlation is 0) may be respectively used as GI1 and GI2. For example, a Ga64 sequence defined in the 11ad standard (see NPL 1) may be used as GI1, and a Gb64 sequence defined in the 11ad standard may be used as GI2.

A combination of π/2-BPSK modulation and a precoding matrix G according to equation (2), equation (2-3), or equation (2-5) is referred to as a first precoding scheme type. A combination of π/2-QPSK modulation and a precoding matrix G according to equation (14) is referred to as a second precoding scheme type. A method of distinguishing between the first precoding scheme type and the second precoding scheme type will be described later.

In a case where first precoding scheme type is used, a selector 112*a* selects an output of a data symbol buffer 108*a*, and a selector 112*b* selects an output of a symbol order reverser 107.

In a case where second precoding scheme type is used, the selector 112*a* selects an output of the GI adder 106*a*, and the selector 112*b* selects an output of the GI adder 106*c*.

Note that the selector 112*a* may be disposed at a location after the GI adder 106*a*, and the selector 112*b* may be disposed at a stage located after the precoder 105*a*.

Next, an expiation is given as to a reason why the transmission apparatus 300 changes the second transmission RF chain process depending on the precoding scheme.

In the first precoding scheme type, $x_1(b, n)$ and $x_2(b, n)$ are in complex conjugate relationship with each other as can be seen in equation (2-2), equation (2-4), or equation (2-6), and they are in a constant multiple relationship with each other. Therefore, in frequency domain, as shown in FIG. 5B and FIG. 5C, the signal subjected to the second transmission RF chain process is a signal obtained as a result of inverting frequencies of the signal subjected to the first transmission RF chain process and is in a complex conjugate relationship with the signal subjected to the first transmission RF chain process.

Figure 11A:
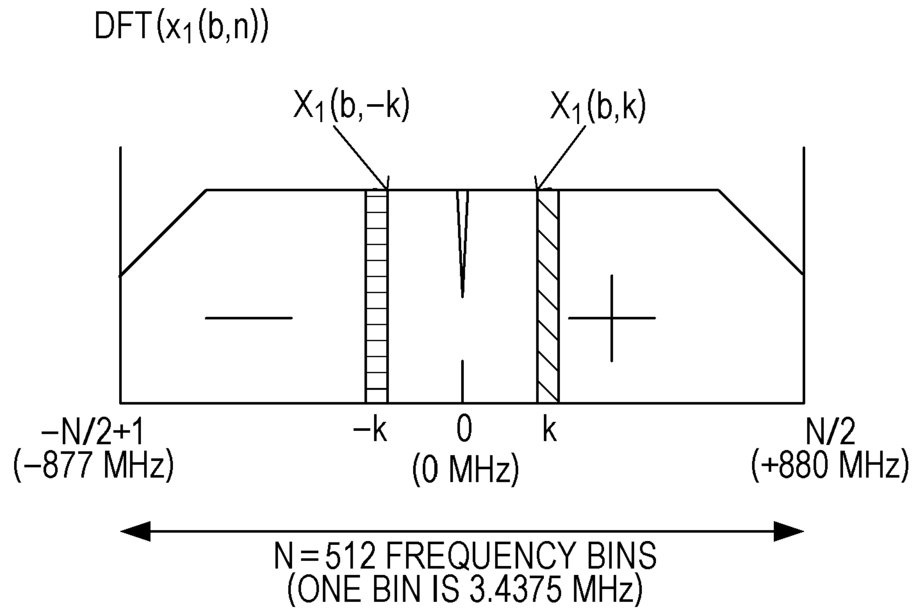
FIG. 11A is a diagram illustrating an example of a DFT signal subjected to a first transmission RF chain process.
Figure 11B:
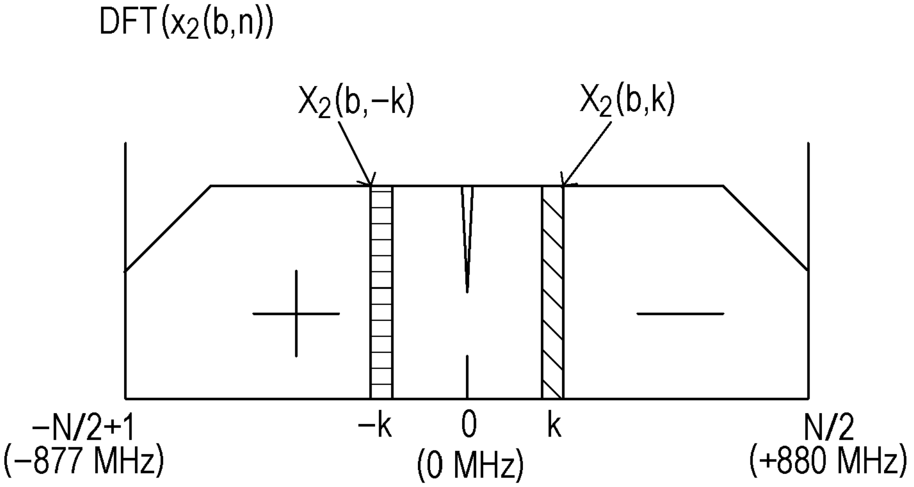
FIG. 11B is a diagram illustrating an example of a DFT signal subjected to a second transmission RF chain process.

On the other hand, in the second precoding scheme type, $x_1(b, n)$ and $x_2(b, n)$ are not in a complex conjugate relationship. Therefore, in frequency domain, as shown in FIG. 11A and FIG. 11B, the signal subjected to the first transmission RF chain process and the signal subjected to the second transmission RF chain process are transmitted at the same frequency. For example, $X_1(b, k)$ and $X_2(b, k)$ are transmitted at an identical frequency, and $X_1(b, -k)$ and $X_2(b, -k)$ are transmitted at an identical frequency.

In a case where a complex number b satisfying equation (15) exists, the precoding scheme is the first precoding scheme type.

$$x_2(m)=bx_1^*(m) \quad (15)$$

Thus, from the above consideration, when the first precoding scheme type is used, the transmission apparatus 300 adds a complex conjugate GI in the second transmission RF chain process and performs a symbol order reversion. That is, the selector 112*b* selects the output from the symbol order reverser 107. On the other hand, for the second precoding scheme type, in the second RF chain process, the same GI as that employed in the first RF chain process is added, and the symbol order reversion is not performed. That is, the selector 112*b* selects the output from the GI encoder 106*c*.

Thus, the transmission apparatus 300 can achieve a frequency diversity effect depending on the phase shift θ given by the phase shifter 109 (and d calculated from θ according to equation (9-1)) regardless of the data modulation scheme and the type of the precoding matrix, as shown in FIG. 6E and FIG. 6F.

In π/2-BPSK, when the precoding matrix shown in equation (2) is used, the constellation after the precoding is performed is identical to that in QPSK (see FIG. 4B). In this case, the precoding scheme is the first precoding scheme type. In π/2-QPSK, when the precoding matrix shown in equation (14) is used, the constellation after the precoding is performed is identical to that in 16QAM (see FIG. 10B). In this case, the precoding scheme is the second precoding scheme type.

Note that in π/2-BPSK modulation, the selectors 112*a* and 112*b* may select input data depending on the type of the precoding scheme.

The transmission apparatus 300 may employ the same transmission parameters in transmission as those in π/2-QPSK and π/2-16QAM used when transmission is performed without performing precoding. The transmission parameters include, for example, setting values of back-off of RF amplifiers in the transmission F/E circuits 110*a* and 110*b*. That is, the transmission apparatus 300 may perform precoding using one of equations (2) or (14) depending on the modulation scheme. This makes it possible to perform transmission without changing the configurations of the transmission F/E circuits 110_a_ and 110_b_. A reason for this is described below.

Figure 10B:
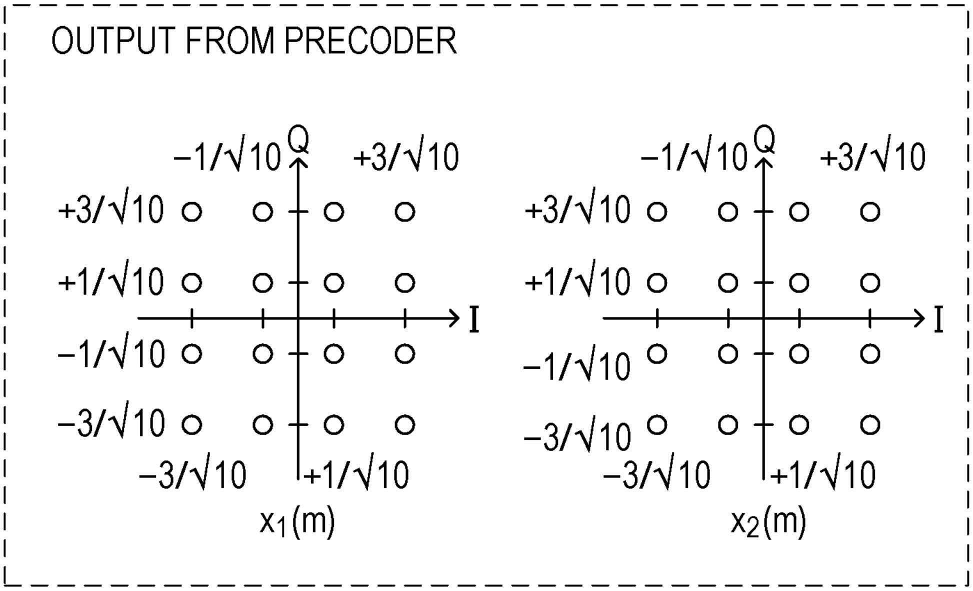
FIG. 10B is a diagram illustrating an example of a constellation for 16QAM modulation.

In general millimeter wave communication, a setting value of back-off for an RF amplifier in a transmission F/E circuit is set or changed properly depending on transmission constellation mapping (FIG. 10A, FIG. 10B, etc.). For example, in 16QAM such as that shown in FIG. 10B, peak power (PAPR) relative to average power is large, and thus the back-off of the RF amplifier is set to be large such that saturation of a signal does not occur in the RF amplifier. Performing of the precoding process can cause a change in constellation mapping of the transmission signal, and thus setting of the transmission F/E circuit is changed.

In contrast, in the transmission apparatus 300 according to the present embodiment, by performing the precoding process using equation (2) or equation (14), it is possible to obtain constellation mapping which is the same as the constellation mapping in known modulation although the constellation mapping becomes different from that which were before the precoding process was performed. That is, the transmission signal has known constellation mapping regardless of whether the precoding process is performed or not, and thus it becomes unnecessary to change the configuration and setting of the transmission F/E circuit, and controlling becomes easy.

Effects of Second Embodiment

In the second embodiment, in a case where the first precoded symbol and the second precoded symbol are in complex conjugate relationship, the transmission apparatus 300 adds, to the second precoded symbol, a complex conjugate of GI added to the first precoded symbol, performs symbol order reversion, and gives a phase shift (phase changing).

This makes it possible to switch among a plurality of data modulation schemes in MIMO channels, and thus it is possible to achieve a high frequency diversity effect. Furthermore, it is also possible to reduce the error rate in communication data and enhance the data throughput.

Modifications of Second Embodiment

In the second embodiment described above, in the case of π/2-BPSK modulation, the transmission apparatus 300 performs MIMO transmission such that the symbol order reverser 107 performs the symbol order reversion on the data symbols and symbols of GI. A modification of the second embodiment is described below. In this modification, the transmission apparatus 400 (see FIG. 12) performs MIMO transmission such that the GI adders 106_d_ and 106_e_ add sequences (for example, orthogonal sequences) which are different for each stream.

Figure 12:
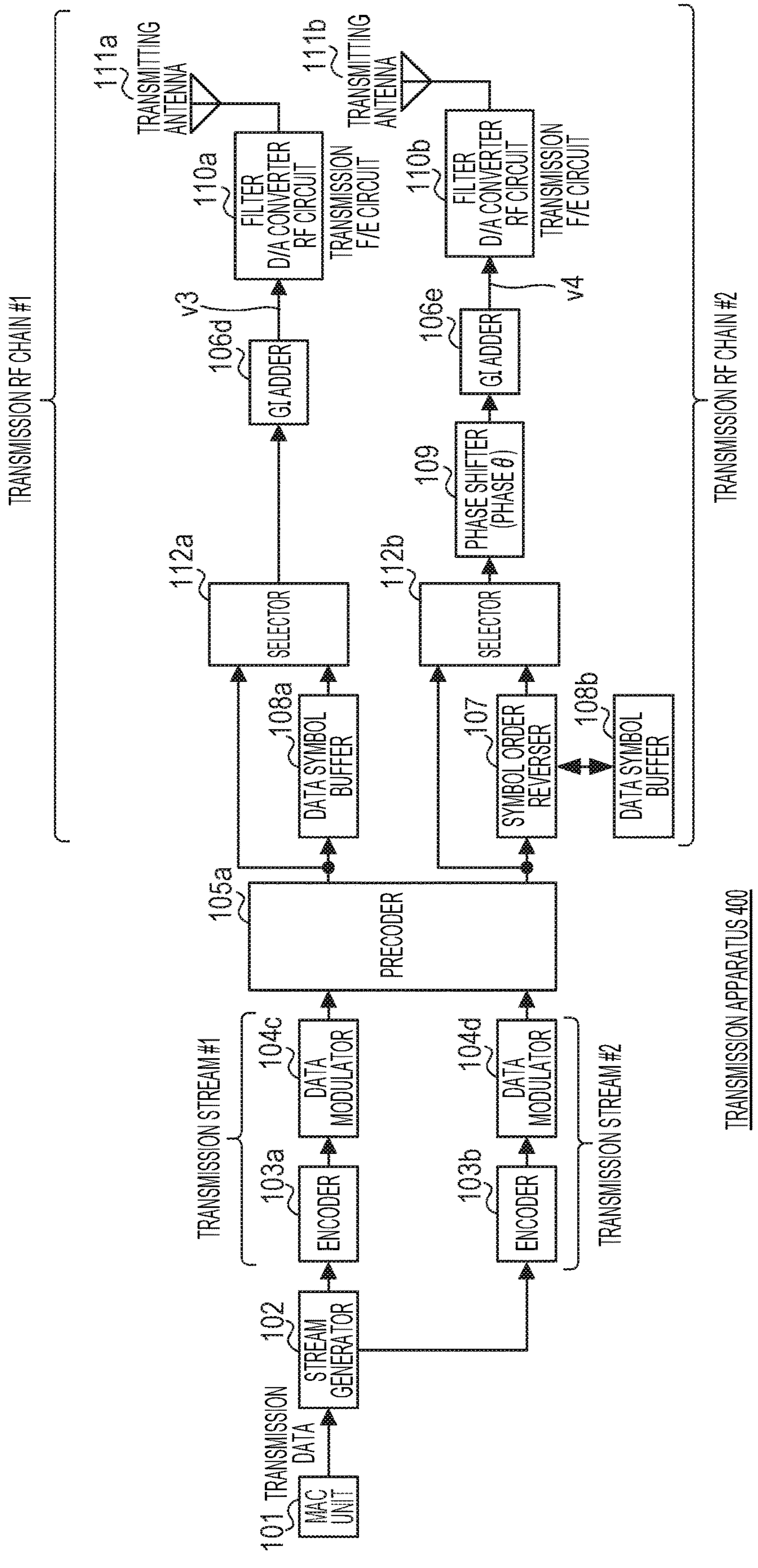
FIG. 12 is a diagram illustrating an example of a configuration of a transmission apparatus according to a modification of the second embodiment.

FIG. 12 is a diagram illustrating an example of a configuration of a transmission apparatus 400 according to a modification of the second embodiment. Note that same constituent elements as those in FIG. 9 are denoted by same numbers, and a further description thereof is omitted.

GI adders 106_d_ and 106_e_ are disposed at stages located after the selectors 112_a_ and 112_b_ and the phase shifter 109. Unlike the transmission apparatus 300 shown in FIG. 9, the transmission apparatus 400 may add a predefined GI symbol on a stream-by-stream basis regardless of the modulation scheme.

Figure 14:
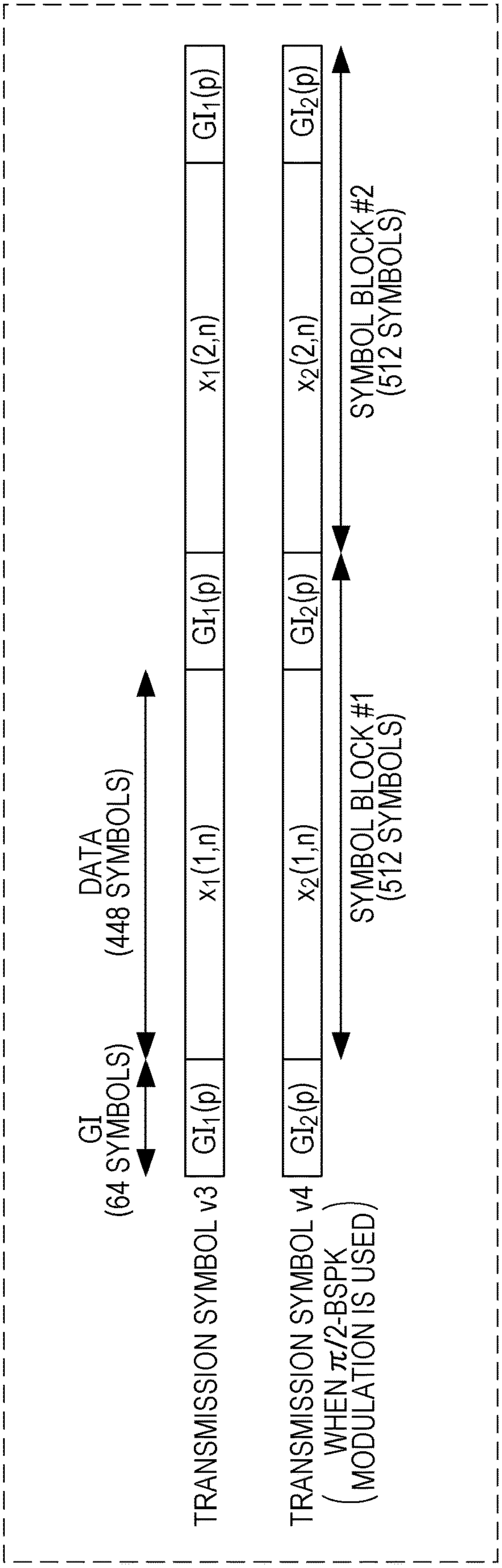
FIG. 14 is a diagram illustrating another example of a GI addition method according to the modification of the second embodiment.

FIG. 13 and FIG. 14 are diagrams each illustrating an example of a transmission symbol format of each of outputs (v3, v4) from the GI adders 106_d_ and 106_e_ in the transmission apparatus 400. The examples shown in FIG. 13 are formats for a case where data symbols are modulated by π/2-BPSK, while the examples shown in FIG. 14 are formats for a case where data symbols are modulated by a modulation scheme other than π/2-BPSK.

The GI adder 106_d_ divides the precoded symbol $x_1(m)$ into data blocks each including 448 symbols, and adds a 64-symbol GI ($GI_1(p)$) in front of each data block. The GI is a symbol sequence obtained as a result of performing π/2-BPSK modulation on a known sequence. Furthermore, the GI adder 106_d_ adds a 64-symbol GI after a last data block. As a result, a transmission symbol v3 such as that shown in FIG. 13 and FIG. 14 is generated. Note that the numbers of symbols employed above are merely examples, and the numbers of symbols in the present embodiment may be different from these examples.

Similarly, the GI adder 106_e_ divides the precoded symbol $x_2(m)$ into data blocks each including 448 symbols, adds a 64-symbol GI ($GI_2(p)$) in front of each data block, and adds a 64-symbol GI after a last data block. As a result, a transmission symbol v4 such as that shown in FIG. 13 and FIG. 14 is generated. GI added by the GI adder 106_e_ may be different from a sequence of GI added by the GI adder 106_d_.

In a case where a transmission signal in a format shown in FIG. 13 and FIG. 14 is received from the transmission apparatus 400, the reception apparatus 200 may perform MMSE equalization according to equation (12-2) as in the first embodiment in the reception process.

The reception apparatus 200 may detect an error of the channel estimation matrix by comparing the MMSE-equalized GI symbol (part associated with GI in the output from the MMSE filter 207) with a known GI symbol, and may correct the channel estimation matrix. In a case where $GI_1(p)$ and $GI_2(p)$ are orthogonal sequences, a calculation is performed to determine a correlation between the $GI_1(p)$ estimated by MMSE equalization and the known $GI_1(p)$. As a result of this calculation, a residual error of MMSE equalization is reduced and, for example, a value of phase shift is calculated with high accuracy. Thus, it is possible to make a high-accuracy correction of a channel estimation matrix, which results in an improvement in reception performance.

Next, a description is given as to another method for the MMSE filter 207 of the reception apparatus 200 to receive a transmission signal in the format shown in FIG. 13 or FIG. 14 from the transmission apparatus 400.

The reception apparatus 200 generates replica signals of $GI_1(p)$ and $GI_2(p)$ according to equation (16). The replica signals are estimated values of signals received via a receiving antenna in a case where a known pattern (for example, $GI_1(p)$ and $GI_2(p)$) is transmitted, and the replica signals are calculated by multiplying the known pattern by the channel matrix (see equation (12)).

$$\begin{cases} \hat{Y}_{G1}(k) = H_{11}(k)X_{G1}(k) + H_{12}(k)X_{G2}(k) \\ \hat{Y}_{G2}(k) = H_{21}(k)X_{G1}(k) + H_{22}(k)X_{G2}(k) \end{cases} \tag{16}$$

In equation (16), $X_{G1}(k)$ and $X_{G2}(k)$ are signals (frequency domain signals of GI) obtained as a result of performing DFT on time-domain GI signals (symbols) $GI_1(p)$ and $GI_2(p)$. $Y_{G1}(k)$ and $Y_{G2}(k)$ are frequency-domain signals obtained when the reception apparatus 200 receives $GI_1(p)$ and $GI_2(p)$. Symbols "^" added to $Y_{G1}(k)$ and $Y_{G2}(k)$ indicate that these are estimated values.

According to equation (17), the reception apparatus 200 subtracts $\hat{Y}_{G1}(k)$ from a reception signal $Y_1(b, k)$ thereby estimating a data signal component $\hat{Y}_{D1}(k)$ included in the reception signal, and subtracts $\hat{Y}_{G2}(k)$ from a reception signal $Y_2(b, k)$ thereby estimating a data signal component $\hat{Y}_{D2}(k)$.

$$\begin{cases} \hat{Y}_{D1}(b,k) = Y_1(b,k) - \hat{Y}_{G1}(k) \\ \hat{Y}_{D2}(b,k) = Y_2(b,k) - \hat{Y}_{G2}(k) \end{cases} \tag{17}$$

The reception apparatus 200 performs MMSE equalization on the estimated data signal component $\hat{Y}_{D1}(k)$ and $\hat{Y}_{D2}(k)$ given as input signals thereby calculating estimated values $\hat{T}_{D1}(k)$ and $\hat{T}_{D2}(k)$ of transmission data symbols.

$$\begin{bmatrix} \hat{T}_{D1}(b,k) \\ \hat{T}_{D2}(b,k) \end{bmatrix} = W_{2\times 2}(k) \begin{bmatrix} \hat{Y}_{D1}(b,k) \\ \hat{Y}_{D2}(b,k) \end{bmatrix} \tag{18}$$

The calculation process performed in equation (18) is similar to that in equation (12-2), except that in contrast to equation (12-2) in which inputs $Y_1(b, k)$ and $Y_2(b, k)$ include signal components of data and GI, inputs $\hat{Y}_{D1}(k)$ and $\hat{Y}_{D2}(k)$ in equation (18) include signal components of data and signal components of GI are removed.

When a transmission signal from the transmission apparatus 400 is received, GI of each stream does not have a complex conjugate relationship and a time order converted relationship, and thus it is difficult for the MMSE filter 207 to achieve a frequency diversity effect in demodulation of the GI symbols similar to the frequency diversity effect achieved in the first embodiment. As a result, there is a possibility that intersymbol interference from GI symbols to data symbols remains after the MMSE equalization, which may result in degradation in reception performance.

In the receiving of a transmission signal from the transmission apparatus 400, the MMSE filter 207 subtracts the GI symbol replica from the reception signal using equation (16), equation (17), and equation (18) in the MMSE equalization. That is, the MMSE equalization of data symbols is performed after the effect of GI is reduced.

The reception apparatus 200 performs a reception process including inverse phase shift and inverse precoding on estimated values of transmission data symbols $\hat{T}_{D1}(k)$ and $\hat{T}_{D2}(k)$ generated by the MMSE filter 207 using equation (18), in a similar manner to the first embodiment and the second embodiment.

Effects of Modifications of Second Embodiment

In the modification of the second embodiment, in a case where the first precoded symbol and the second precoded symbol are in a complex conjugate relationship, the transmission apparatus 400 performs the symbol order reversion and the phase shift (phase changing) on the second precoded symbol. Furthermore, different GIs are inserted in the first precoded symbol and the second precoded symbol.

This makes it possible to switch among a plurality of data modulation schemes in MIMO channels, and thus it is possible to achieve a high frequency diversity effect. Furthermore, it is also possible to reduce the error rate in communication data and enhance the data throughput.

Summary of Embodiments

In a first aspect, the present disclosure provides a transmission apparatus including a signal processing circuit that generates a first precoded signal and a second precoded signal by performing a precoding process on a first baseband signal and a second baseband signal, and generates a second reversed signal by performing an order reversion process on a symbol sequence forming the second precoded signal thereby generating a first transmission signal and a second transmission signal from the first baseband signal and the second baseband signal, and a transmission circuit that transmits the first transmission signal and the second transmission signal respectively from different antennas.

In a second aspect, the present disclosure provides a transmission apparatus based on the first aspect, in which the signal processing circuit generates a second phase-changed signal by performing a phase change process on the second reversed signal thereby generating the first transmission signal and the second transmission signal from the first baseband signal and the second baseband signal.

In a third aspect, the present disclosure provides a transmission apparatus based on the first aspect, in which the signal processing circuit adds a first known signal to the first precoded signal and adds a second known signal having a complex conjugate relationship with the first known signal to the second precoded signal thereby generating the first transmission signal and the second transmission signal from the first baseband signal and the second baseband signal.

In a fourth aspect, the present disclosure provides a transmission apparatus based on the second aspect, in which the signal processing circuit performs the order reversion process on a symbol sequence forming the second known signal and concatenates the reversed second precoded signal to the reversed second known signal thereby generating the second reversed signal thereby generating the first transmission signal and the second transmission signal from the first baseband signal and the second baseband signal.

In a fifth aspect, the present disclosure provides a transmission apparatus based on the second aspect, in which the signal processing circuit performs the order reversion process on a symbol sequence obtained as a result of concatenating the second known signal to the second precoded signal thereby generating the second reversed signal, thereby generating the first transmission signal and the second transmission signal from the first baseband signal and the second baseband signal.

In a sixth aspect, the present disclosure provides a transmission apparatus based on the third aspect, in which the signal processing circuit adds a third known signal to the second precoded signal, and selects, based on whether the first baseband signal and the second baseband signal are in a complex conjugate relationship, whether the second reversed signal or the second precoded signal added with the third known signal is to be subjected to a phase change process thereby generating the first transmission signal and the second transmission signal from the first baseband signal and the second baseband signal.

In a seventh aspect, the present disclosure provides a transmission method including generating a first precoded signal and a second precoded signal by performing a precoding process on a first baseband signal and a second baseband signal, and generating a second reversed signal by performing an order reversion process on a symbol sequence forming the second precoded signal thereby generating a first transmission signal and a second transmission signal from the first baseband signal and the second baseband signal, and transmitting the first transmission signal and the second transmission signal respectively from different antennas.

In an eighth aspect, the present disclosure provides a reception apparatus including a reception circuit that receives a first reception signal and a second reception signal respectively from different antennas, and a demodulation circuit that generates a first baseband signal and a second baseband signal from the first reception signal and the second reception signal, wherein the first reception signal and second reception signal include a first precoded signal and a second reversed signal, the first precoded signal is a signal generated by a transmission apparatus by performing a precoding process on the first baseband signal and the second baseband signal, and the second reversed signal is a signal generated by a transmission apparatus by performing a precoding process on the first baseband signal and the second baseband signal thereby generating a second precoded signal and performing an order reversion process on a symbol sequence forming the generated second precoded signal.

In a ninth aspect, the present disclosure provides a reception method including receiving a first reception signal and a second reception signal respectively by different antennas, and generating a first baseband signal and a second baseband signal from the first reception signal and the second reception signal, wherein the first reception signal and second reception signal include a first precoded signal and a second reversed signal, the first precoded signal is a signal generated by a transmission apparatus by performing a precoding process on the first baseband signal and the second baseband signal, and the second reversed signal is a signal generated by the transmission apparatus by performing a precoding process on the first baseband signal and the second baseband signal thereby generating a second precoded signal and performing an order reversion process on a symbol sequence forming the generated second precoded signal.

Various embodiments have been described above with reference to drawings. However, the present disclosure are not limited to these embodiments. It should be understood by those skilled in the art that various modifications or alterations may occur within the scope of the appended claims. Note that such modifications or alterations also fall within the scope of the present disclosure. Furthermore, various combinations of constituent elements of the embodiments may occur without departing from the scope of the present disclosure.

In the embodiments described above, it is assumed by way of example that the present disclosure is implemented using hardware. However, the present disclosure may be implemented using software in cooperation with hardware.

Each functional block according to the embodiments described above may be typically realized by an integrated circuit such as an LSI having input and output terminals. Each of the functional blocks may be formed individually on one chip, or part or all of the functional blocks may be formed on one chip. The system LSI may also be referred to as an IC, an LSI circuit, a super LSI circuit, or an ultra LSI circuit depending on the degree of integration.

Furthermore, the technique of implementing the integrated circuit is not limited to the LSI, but the integrated circuit may be realized in the form of a dedicated circuit or a general-purpose processor. The integrated circuit may also be realized using an FPGA (Field Programmable Gate Array) that can be programmed after the manufacture of the LSI or a reconfigurable processor that is allowed to be reconfigured in terms of the connection or the setting of circuit cells in the inside of the LSI.

When a new integration circuit technique other than LSI techniques are realized in the future by an advance in semiconductor technology or related technology, the functional blocks may be realized using such a new technique. A possible example of a new technique is biotechnology.

The present disclosure is applicable to a wide variety of communication systems in which a modulated signal is transmitted from a plurality of antennas.

What is claimed is:

1. A transmission apparatus comprising:

a signal processing circuit that generates a first precoded signal and a second precoded signal by performing a precoding process on a first baseband signal and a second baseband signal, and generates a second reversed signal by performing an order reversion process on a symbol sequence forming the second precoded signal, thereby generating a first transmission signal and a second transmission signal from the first baseband signal and the second baseband signal, wherein the signal processing circuit adds a first known signal to the first precoded signal and adds a second known signal having a complex conjugate relationship with the first known signal to the second precoded signal, wherein the signal processing circuit performs the order reversion process on a symbol sequence forming the second known signal and concatenates the reversed second precoded signal to the reversed second known signal thereby generating the second reversed signal; and a transmission circuit that transmits the first transmission signal and the second transmission signal respectively from different antennas.

2. The transmission apparatus according to claim 1, wherein the signal processing circuit generates a second phase-changed signal by performing a phase change process on the second reversed signal thereby generating the first transmission signal and the second transmission signal from the first baseband signal and the second baseband signal.

3. The transmission apparatus according to claim 1, wherein the signal processing circuit performs the order reversion process on a symbol sequence obtained as a result of concatenating the second known signal to the second precoded signal thereby generating the second reversed signal, thereby generating the first transmission signal and the second transmission signal from the first baseband signal and the second baseband signal.

4. The transmission apparatus according to claim 1, wherein the signal processing circuit adds a third known signal to the second precoded signal, and selects, based on whether the first baseband signal and the second baseband signal are in a complex conjugate relationship, whether the second reversed signal or the second precoded signal added with the third known signal is to be subjected to a phase change process, thereby generating the first transmission signal and the second transmission signal from the first baseband signal and the second baseband signal.

5. A transmission method comprising:

generating a first precoded signal and a second precoded signal by performing a precoding process on a first baseband signal and a second baseband signal;

adding a first known signal to the first precoded signal and adding a second known signal having a complex conjugate relationship with the first known signal to the second precoded signal; and generating a second reversed signal by performing an order reversion process on a symbol sequence forming the second precoded signal;

performing the order reversion process on a symbol sequence forming the second known signal and concatenating the reversed second precoded signal to the reversed second known signal thereby generating the second reversed signal, thereby generating a first transmission signal and a second transmission signal from the first baseband signal and the second baseband signal; and transmitting the first transmission signal and the second transmission signal respectively from different antennas.

6. A reception apparatus comprising:

a reception circuit that receives a first reception signal and a second reception signal respectively from different antennas; and a demodulation circuit that generates a first baseband signal and a second baseband signal from the first reception signal and the second reception signal;

wherein the first reception signal and second reception signal include a first precoded signal and a second reversed signal, the first precoded signal is a signal generated by a transmission apparatus by performing a precoding process on the first baseband signal and the second baseband signal, and adding a first known signal to the first precoded signal, and the second reversed signal is a signal generated by the transmission apparatus by performing a precoding process on the first baseband signal and the second baseband signal thereby generating a second precoded signal, adding a second known signal having a complex conjugate relationship with the first known signal to the second precoded signal, performing an order reversion process on a symbol sequence forming the generated second precoded signal, performing the order reversion process on a symbol sequence forming the second known signal and concatenating the reversed second precoded signal to the reversed second known signal thereby generating the second reversed signal.

7. A reception method comprising:

receiving a first reception signal and a second reception signal respectively by different antennas; and generating a first baseband signal and a second baseband signal from the first reception signal and the second reception signal;

wherein the first reception signal and second reception signal include a first precoded signal and a second reversed signal, the first precoded signal is a signal generated by a transmission apparatus by performing a precoding process on the first baseband signal and the second baseband signal, and adding a first known signal to the first precoded signal, and the second reversed signal is a signal generated by the transmission apparatus by performing a precoding process on the first baseband signal and the second baseband signal thereby generating a second precoded signal, adding a second known signal having a complex conjugate relationship with the first known signal to the second precoded signal, performing an order reversion process on a symbol sequence forming the generated second precoded signal, performing the order reversion process on a symbol sequence forming the second known signal and concatenating the reversed second precoded signal to the reversed second known signal thereby generating the second reversed signal.

* * * * *